(12) United States Patent
Harada et al.

(10) Patent No.: US 11,472,903 B2
(45) Date of Patent: Oct. 18, 2022

(54) COMPOSITION FOR POLYMERIZATION, POLYMER OF SAME AND METHOD FOR PRODUCING POLYMER

(71) Applicant: Osaka University, Suita (JP)

(72) Inventors: Akira Harada, Suita (JP); Hiroyasu Yamaguchi, Suita (JP); Yoshinori Takashima, Suita (JP); Tomoko Tokuhara, Suita (JP); Suguru Nomimura, Suita (JP); Hikaru Aramoto, Suita (JP); Ryohei Ikura, Suita (JP); Nanami Okano, Suita (JP)

(73) Assignee: Osaka University, Suita (JP)

( * ) Notice: Subject to any disclaimer, the term of this patent is extended or adjusted under 35 U.S.C. 154(b) by 216 days.

(21) Appl. No.: 16/612,046

(22) PCT Filed: May 11, 2018

(86) PCT No.: PCT/JP2018/018424
§ 371 (c)(1),
(2) Date: Nov. 8, 2019

(87) PCT Pub. No.: WO2018/207934
PCT Pub. Date: Nov. 15, 2018

(65) Prior Publication Data
US 2021/0155731 A1 May 27, 2021

(30) Foreign Application Priority Data

May 11, 2017 (JP) .............................. JP2017-095058

(51) Int. Cl.
*C08F 220/58* (2006.01)
*C08F 251/00* (2006.01)
*C09D 4/06* (2006.01)

(52) U.S. Cl.
CPC ................. *C08F 220/58* (2013.01)

(58) Field of Classification Search
CPC ......... C08F 220/58; C08F 251/00; C09D 4/06
See application file for complete search history.

(56) References Cited

U.S. PATENT DOCUMENTS

2009/0214871 A1\* 8/2009 Fukuda .................. C08B 33/00
428/413
2010/0136706 A1 6/2010 Miyata et al.
(Continued)

FOREIGN PATENT DOCUMENTS

JP 2012-224559 A 11/2012
JP 2016-216724 A 12/2016
(Continued)

OTHER PUBLICATIONS

International Search Report dated Jul. 17, 2018, issued for PCT/JP2018/018424.

*Primary Examiner* — Catherine S Branch
(74) *Attorney, Agent, or Firm* — Locke Lord LLP; James E. Armstrong, IV; Nicholas J. DiCeglie, Jr.

(57) ABSTRACT

Provided are a composition for polymerization from which a macromolecular material that contains a host-group-introduced polymer with excellent energy to failure can be produced without using a solvent; a polymer of the composition; and a method for producing the polymer. The composition for polymerization contains a solution containing a first polymerizable compound and a host-group-containing polymerizable compound that is dissolved in the first polymerizable compound, wherein the host group present in the host-group-containing polymerizable compound is a group formed by removing one hydrogen atom or hydroxy group from a cyclodextrin, and wherein the cyclodextrin is at least one cyclodextrin selected from the group consisting of α-cyclodextrin, β-cyclodextrin, and γ-cyclodextrin.

21 Claims, 8 Drawing Sheets

(56) References Cited

U.S. PATENT DOCUMENTS

2015/0073091 A1 3/2015 Harada et al.
2019/0225936 A1 7/2019 Harada et al.

FOREIGN PATENT DOCUMENTS

| WO | 2008/139902 A1 | 11/2008 |
| WO | 2013/162019 A1 | 10/2013 |
| WO | 2017/159346 A1 | 9/2017 |
| WO | 2018/021289 A1 | 2/2018 |

* cited by examiner (a)

(b)

(6-1)

(6-2)

(7 − 1)

(8 − 1)

(8 − 2)

(8 − 3)

(9 − 1)

(9 − 2)

(10-3)

(10-4)

US 11,472,903 B2

COMPOSITION FOR POLYMERIZATION, POLYMER OF SAME AND METHOD FOR PRODUCING POLYMER

CROSS-REFERENCE TO RELATED APPLICATIONS

This Application is a 371 U.S. National Phase Application of PCT/JP2018/018424, filed May 11, 2018, which application claims priority to Application Japanese Patent Application No. 2017-095058, filed on May 11, 2017. The entire contents of these applications are incorporated herein by reference in their entirety.

TECHNICAL FIELD

The present invention relates to a composition for polymerization, a polymer of the composition, and a method for producing the polymer.

BACKGROUND ART

Supramolecular materials with various kinds of functionality have been actively developed by skillfully using non-covalent interaction such as host-guest interaction. For example, PTL 1 discloses a macromolecular material with self-restorable function that takes advantage of the reversibility of host-guest interaction. Having excellent strength and elongation over traditional macromolecular materials due to the host-guest interaction caused by a host group and a guest group in the polymer, such macromolecular materials hold great promise as novel functional macromolecular materials.

Host-group-containing macromolecular materials are known to be produced by, for example, polymerizing a starting material containing a host-group-containing polymerizable monomer. These host-group-containing macromolecular materials are highly useful materials because they alone can bring about their unique function, and can also form a macromolecular material capable of having host-guest interaction when combined with a guest-group-containing macromolecular material. Thus, there is demand for host-group-containing macromolecular materials with further improved physical properties, and establishment of a technique to produce such host-group-containing macromolecular materials in a simpler manner.

CITATION LIST

Patent Literature

PTL 1: WO2013/162019

SUMMARY OF INVENTION

Technical Problem

However, traditional host-group-containing macromolecular materials are produced by, for example, performing polymerization of a polymerizable monomer in an aqueous solvent; because of the use of a solvent in the reaction, the step of removing the solvent is necessary. Specifically, because host-group-containing polymerizable monomers are poorly compatible with other polymerizable monomers (e.g. a polymerizable monomer that is the main component), an aqueous solvent that dissolves a host-group-containing polymerizable monomer must be used in order to perform polymerization efficiently. This makes the production steps complicated, and requires more time for production. Additionally, due to the use of a solvent during the production, host-group-containing macromolecular materials are sometimes difficult to form into, for example, a coating or a film, and are likely to have limitations in application.

The present invention was made in view of the current situation. An object of the invention is to provide a composition for polymerization from which a macromolecular material that contains a host-group-introduced polymer with excellent energy to failure can be produced without using a solvent; a polymer of the composition; and a method for producing the polymer.

Solution to Problem

The present inventors conducted extensive research to achieve the object, and found that a mixture containing a host-group-containing polymerizable compound and a polymerizable compound that can dissolve this host-group-containing polymerizable compound can achieve the object. The inventors then completed the invention.

Specifically, the present invention includes, for example, the subject matter described in the following items.

Item 1.

A composition for polymerization, the composition comprising a solution containing a first polymerizable compound and a host-group-containing polymerizable compound that is dissolved in the first polymerizable compound, wherein the host group present in the host-group-containing polymerizable compound is a group formed by removing one hydrogen atom or hydroxy group from a cyclodextrin, and wherein the cyclodextrin is at least one cyclodextrin selected from the group consisting of α-cyclodextrin, β-cyclodextrin, and γ-cyclodextrin.

Item 2.

The composition for polymerization according to Item 1, wherein the first polymerizable compound is a polymerizable vinyl compound.

Item 3.

The composition for polymerization according to Item 1 or 2, wherein the first polymerizable compound contains a (meth)acrylamide derivative.

Item 4.

The composition for polymerization according to any one of Items 1 to 3, further comprising a guest-group-containing polymerizable compound.

Item 5.

The composition for polymerization according to Item 4, wherein the host-group-containing polymerizable compound and the guest-group-containing polymerizable compound are together in the form of a clathrate complex.

Item 6.

A polymer of the composition for polymerization of any one of Items 1 to 5.

Item 7.

A method for producing a polymer, the method comprising polymerizing the composition for polymerization of any one of Items 1 to 5 in the absence of a solvent to obtain the polymer.

Advantageous Effects of Invention

The composition for polymerization according to the present invention enables the production of a macromolecular material containing a host-group-introduced polymer without using a solvent, and even enables the production of a macromolecular material with excellent energy to failure.

DESCRIPTION OF EMBODIMENTS

Figure 1:
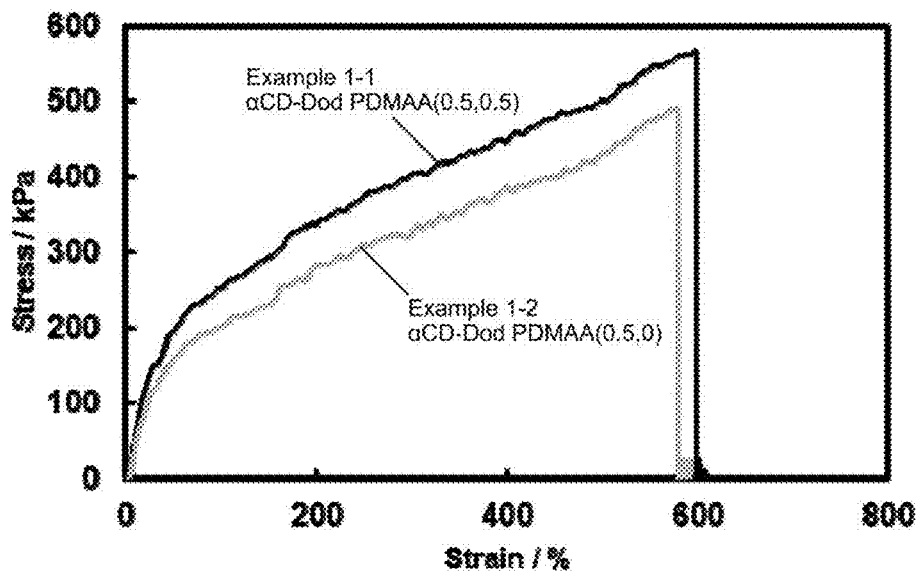
FIG. 1 shows the results of a tensile test on the polymers obtained in Examples 1-1 and 1-2.
Figure 2:
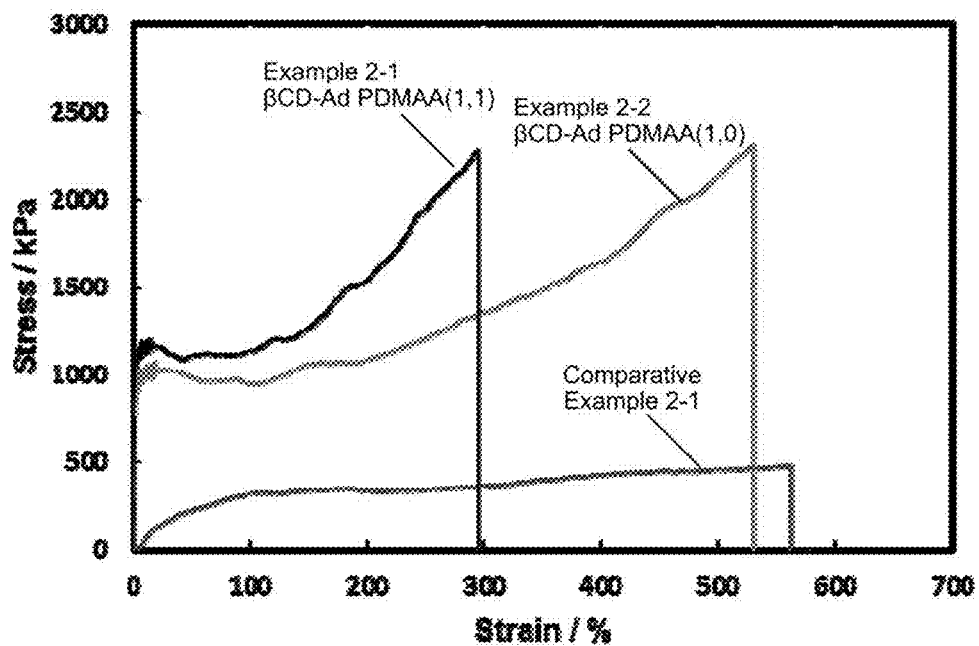
FIG. 2 shows the results of a tensile test on the polymers obtained in Examples and a Comparative Example.

The following describes embodiments of the present invention in detail. In the present specification, the terms "comprise," "contain," and "include" include the concepts of "comprise," "consist essentially of," and "consist of."
1. Composition for Polymerization The composition for polymerization according to the present invention comprises a solution containing a first polymerizable compound and a host-group-containing polymerizable compound that is dissolved in the first polymerizable compound. The host group present in the host-group-containing polymerizable compound is a group formed by removing one hydrogen atom or hydroxy group from a cyclodextrin. The cyclodextrin is at least one cyclodextrin selected from the group consisting of α-cyclodextrin, β-cyclodextrin, and γ-cyclodextrin.

The composition for polymerization according to the present invention is usable as a starting material for preparing a host-group-containing polymer. A polymer can be prepared by polymerizing the composition for polymerization. In particular, the composition for polymerization according to the present invention can be subjected to polymerization without a solvent for dissolving the host-group-containing polymerizable compound because the composition for polymerization contains a solution in which the host-group-containing polymerizable compound is dissolved in the first polymerizable compound. Additionally, due to the absence of the solvent for polymerization, the obtained polymer is strong, and excellent in energy to failure. Just to note, the "solvent for polymerization" as used in the present invention is a compound typically used in polymerization and refers to a compound that is other than the first polymerizable compound, the host-group-containing polymerizable compound, and a guest-group-containing polymerizable compound described later, and that does not undergo polymerization.

The host-group-containing polymerizable compound is a compound containing a host group and a polymerizable functional group in the molecule.

The host group is a group formed by removing one hydrogen atom or hydroxy group from a cyclodextrin. The cyclodextrin is at least one member selected from the group consisting of α-cyclodextrin, β-cyclodextrin, and γ-cyclodextrin.

Examples of the host-group-containing polymerizable compound include polymerizable monomers containing a host group and a polymerizable functional group in the molecule. The host-group-containing polymerizable compound is not limited to a polymerizable monomer, and includes, for example, a multimer, such as a dimer and a trimer, an oligomer, and a prepolymer (all of which are polymerizable), as long as the compound contains a host group and a polymerizable functional group; the host-group-containing polymerizable compound can also be a mixture containing two or more of these.

The polymerizable functional group is not particularly limited. The term "polymerizable" as used in the present specification means having the nature to undergo, for example, radical polymerization, ion polymerization, polycondensation (condensation polymerization), addition-condensation polymerization, living polymerization, living radical polymerization, or other various known types of polymerization.

Examples of polymerizable functional groups include, in addition to an alkenyl group and a vinyl group, —OH, —SH, —NH$_2$, —COOH, —SO$_3$H, —PO$_4$H, and an isocyanate group.

Examples of polymerizable functional groups include radically polymerizable functional groups. The radically polymerizable functional groups include groups having a carbon-carbon double bond. Specifically, the radically polymerizable functional groups include an acryloyl group (CH$_2$=CH(CO)), a methacryloyl group (CH$_2$=CCH$_3$(CO)), a styryl group, a vinyl group, and an allyl group. These groups having a carbon-carbon double bond may further be substituted as long as the radically polymerizable properties are not interfered with.

The host-group-containing polymerizable compound is not particularly limited in structure as long as the host-group-containing polymerizable compound contains the host group and a polymerizable functional group. Specific examples of the host-group-containing polymerizable compound include polymerizable vinyl monomers to which the host group is bound.

A specific example of the host-group-containing polymerizable compound is a compound represented by the following formula (h1):

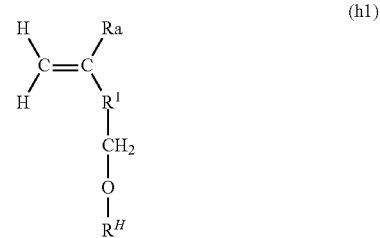

wherein Ra represents a hydrogen atom or a methyl group, $R^H$ represents the host group, and $R^1$ represents a divalent group formed by removing one hydrogen atom from a monovalent group selected from the group consisting of a hydroxy group, a thiol group, an alkoxy group optionally having at least one substituent, a thioalkoxy group optionally having at least one substituent, an alkyl group optionally having at least one substituent, an amino group optionally having one substituent, an amide group optionally having one substituent, an aldehyde group, and a carboxy group.

Alternatively, the host-group-containing polymerizable compound is a compound represented by the following formula (h2):

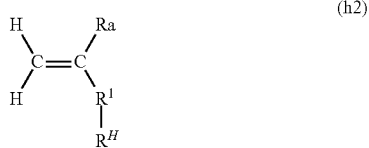

wherein Ra, $R^H$, and $R^1$ are respectively synonymous with Ra, $R^H$, and $R^1$ of formula (h1).

Additionally, the host-group-containing polymerizable compound is represented by the following formula (h3):

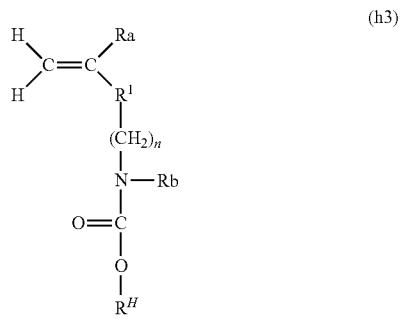

wherein Ra, $R^H$, and $R^1$ are respectively synonymous with Ra, $R^H$, and $R^1$ of formula (h1); n represents an integer of 1 to 20, preferably 1 to 10, and more preferably 1 to 5; and Rb represents hydrogen or a linear or branched alkyl group having 1 to 20 carbon atoms (preferably a linear or branched alkyl group having 1 to 10 carbon atoms, and more preferably a linear or branched alkyl group having 1 to 6 carbon atoms).

The host-group-containing polymerizable compound may contain at least one or all of the compounds represented by formula (h1), formula (h2), or formula (h3). In this case, Ra of formula (h1), Ra of formula (h2), and Ra of formula (h3) may be identical or different. Likewise, $R^H$ of formula (h1), $R^H$ of formula (h2), and $R^H$ of formula (h3) may be identical or different; and $R^1$ of formula (h1), $R^1$ of formula (h2), and $R^1$ of formula (h3) may be identical or different.

The substituents in formulas (h1) to (h3) are not particularly limited. For example, such substituents include a linear or branched alkyl group having 1 to 20 carbon atoms, a linear or branched alkenyl group having 1 to 20 carbon atoms, a linear or branched alkynyl group having 1 to 20 carbon atoms, a halogen atom, a carboxy group, a carbonyl group, a sulfonyl group, a sulfone group, and a cyano group.

When $R^1$ in formulas (h1) to (h3) is a divalent group formed by removing one hydrogen atom from an amino group optionally having one substituent, the nitrogen atom of the amino group can bond to the carbon atom of the C=C double bond.

When $R^1$ in formulas (h1) to (h3) is a divalent group formed by removing one hydrogen atom from an amide group optionally having one substituent, the carbon atom of the amide group can bond to the carbon atom of the C=C double bond.

When $R^1$ in formulas (h1) to (h3) is a divalent group formed by removing one hydrogen atom from an aldehyde group, the carbon atom of the aldehyde group can bond to the carbon atom of the C=C double bond.

When $R^1$ in formulas (h1) to (h3) is a divalent group formed by removing one hydrogen atom from a carboxy group, the carbon atom of the carboxy group can bond to the carbon atom of the C=C double bond.

The host-group-containing polymerizable monomers represented by formulas (h1) to (h3) are, for example, preferably a (meth)acrylic acid ester derivative (i.e., $R^1$ is —COO—), or a (meth)acrylamide derivative (i.e., $R^1$ is —CONH— or —CONR—, and R is synonymous with the substituent described above). In these cases, polymerization easily proceeds, and the obtained polymer can exhibit higher toughness and strength. In the present specification, (meth)acrylic refers to either acrylic or methacrylic.

The host-group-containing polymerizable compound may be a single compound or a mixture of two or more compounds.

The method for producing the host-group-containing polymerizable compound is not particularly limited. An embodiment of the method for producing the host-group-containing polymerizable compound is the following: a polymerizable compound containing no host group is reacted with a cyclodextrin or a cyclodextrin derivative to obtain a host-group-containing polymerizable compound. This production method is simply referred to as "monomer production method 1" below.

More specifically, monomer production method 1 comprises the step of reaching a polymerizable monomer containing no host group with a cyclodextrin to prepare a host-group-containing polymerizable monomer.

The polymerizable monomer containing no host group in monomer production method 1 includes the compounds represented by the following formulas (h1-1) or (h1-2).

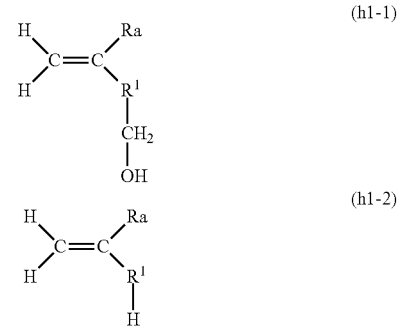

In formulas (h1-1) and (h1-2), Ra represents a hydrogen atom or a methyl group, and $R^1$ is synonymous with $R^1$ of formula (h1).

When the compound represented by formula (h1-1) is used in monomer production method 1 to prepare a host-group-containing polymerizable compound, the host-group-containing polymerizable monomer represented by formula (h1) is obtained. When the compound represented by formula (h1-2) is used to prepare a host-group-containing polymerizable compound, the host-group-containing polymerizable monomer represented by formula (h2) is obtained.

Monomer production method 1 may also comprise the step of subjecting the compound represented by formula (h1-1) or (h1-2) and a cyclodextrin to dehydration condensation in a solvent, optionally in the presence of an acid catalyst.

Dehydration condensation can be performed, for example, in the presence of an acid catalyst. The acid catalyst is not particularly limited, and a wide range of known catalysts are usable. Examples include p-toluenesulfonic acid, aluminum chloride, and hydrochloric acid. The amount of an acid catalyst for use may be, for example, 20 mol % or less, and preferably 10 mol % or less based on the cyclodextrin, and 0.001 mol % or more, preferably 0.01 mol % or more, and more preferably 0.1 mol % or more based on the cyclodextrin or cyclodextrin derivative.

The solvent for use in monomer production method 1 is also not particularly limited. Examples include water, dimethylformamide, dimethyl sulfoxide, and N-methylpyrrolidone. In particular, from the standpoint of convenience in adjusting the concentration of the acid and convenience in controlling the reaction, the solvent is preferably dimethylformamide, dimethyl sulfoxide, N-methylpyrrolidone, or water, and particularly preferably dimethylformamide or water.

The reaction temperature and reaction time for dehydration condensation are also not limited, and dehydration condensation can be performed under appropriate conditions. From the standpoint of promptly performing a reaction, the reaction temperature is preferably 25 to 90° C., and the reaction time is preferably 1 to 3 hours. The reaction time is more preferably 5 minutes to 1 hour. After the reaction, purification may be performed by a known purification technique.

The host-group-containing polymerizable monomer can be obtained by monomer production method 1. The method for producing the host-group-containing polymerizable compound is not limited to monomer production method 1, and the host-group-containing polymerizable compound can also be produced by other known methods. However, dehydration condensation described above has an advantage in that a host-group-containing polymerizable compound can be produced through one-step reaction.

The first polymerizable compound contained in the composition for polymerization according to the present invention can dissolve the host-group-containing polymerizable compound and contains a polymerizable functional group. Examples of the type of the polymerizable functional group are as those of the polymerizable functional group of the host-group-containing polymerizable compound. The polymerizable functional group contained in the first polymerizable compound is preferably a radically polymerizable functional group; specifically, such a polymerizable functional group includes an acryloyl group ($CH_2=CH(CO)$), a methacryloyl group ($CH_2=CCH_3(CO)$), a styryl group, a vinyl group, and an allyl group. These carbon-carbon-double-bond-containing groups may further optionally be substituted as long as the radically polymerizable properties are not interfered with.

The first polymerizable compound is, for example, a polymerizable monomer containing no host group in the molecule. The first polymerizable compound is also not limited to a polymerizable monomer, and includes, for example, a multimer, such as a dimer and a trimer, an oligomer, and a prepolymer (all of which are polymerizable) as long as the compound contains a polymerizable functional group; the first polymerizable compound can also be a mixture containing two or more of these.

The type of the first polymerizable compound is not particularly limited as long as the first polymerizable compound can dissolve the host-group-containing polymerizable compound and contains a polymerizable functional group.

1 L of the first polymerizable compound can preferably dissolve 1 g or more, more preferably 40 g or more, still more preferably 50 g or more, and particularly preferably 70 g or more of the host-group-containing polymerizable compound, for example, at 25° C. or higher. Depending on the combination of the first polymerizable compound and the host-group-containing polymerizable compound, 1 L of the first polymerizable compound can dissolve 500 g or more of the host-group-containing polymerizable compound, for example, at 25° C. or higher.

The term "dissolve" as used in the present specification means that the solution containing the first polymerizable compound and the host-group-containing polymerizable compound becomes transparent, and that one of them is not dispersed or phase separation, for example, does not occur.

The first polymerizable compound may be a liquid or a solid at room temperature (e.g., at 25° C.). When the first polymerizable compound is a solid at 25° C., the solid is, for example, heated to melt it, and 1 L of the melted first polymerizable compound (e.g., at the melting point of the solid) can preferably dissolve 1 g or more, more preferably 40 g or more, still more preferably 50 g or more, and particularly preferably 70 g or more of the host-group-containing polymerizable compound.

The first polymerizable compound is preferably a polymerizable vinyl compound. In this case, a polymer is easily obtained due to excellent solubility of the host-group-containing polymerizable compound in a polymerizable vinyl compound, and its excellent polymerization reactivity with the host-group-containing polymerizable compound.

When the first polymerizable compound is a polymerizable vinyl compound, examples of such a first polymerizable compound include various compounds copolymerizable with the host-group-containing polymerizable compound and a guest-group-containing polymerizable compound described later. In this case, examples of the first polymerizable compound include (meth)acrylamide derivatives and (meth)acrylic esters.

The first polymerizable compound preferably contains a (meth)acrylamide derivative among polymerizable vinyl compounds. In this case, the solubility of the host-group-containing polymerizable compound in the first polymerizable compound is further increased, and the polymerization reactivity of the first polymerizable compound with the host-group-containing polymerizable compound becomes excellent.

Examples of the (meth)acrylamide derivative include the compound represented by the following formula (1):

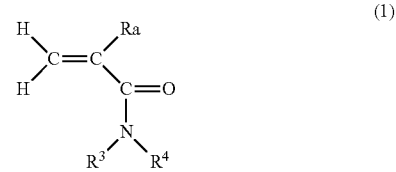

(1)

wherein, Ra represents a hydrogen atom or a methyl group, $R^3$ represents a hydrogen atom or an optionally substituted hydrocarbon group having 1 to 10 carbon atoms, $R^4$ represents an optionally substituted hydrocarbon group having 1 to 10 carbon atoms, and $R^3$ and $R^4$ may be bound to each other through, or not through, a heteroatom to form a saturated ring, taken together with a nitrogen atom to which $R^3$ and $R^4$ are bound.

In formula (1), when $R^3$ is an optionally substituted hydrocarbon group having 1 to 10 carbon atoms, the hydrocarbon group may be an alkyl group, an alkenyl group, or an alkynyl group. The hydrocarbon group may also be linear or branched. When $R^3$ is an optionally substituted hydrocarbon group having 1 to 10 carbon atoms, examples of the substituent include a hydroxy group, an amino group, an amino group substituted with one or two alkyl groups (number of carbon atoms: 1 to 3) ("N-alkyl-substituted amino group" below), a halogen atom, a carboxy group, a carbonyl group, a sulfonyl group, a sulfone group, and a cyano group.

Specific examples of $R^3$ include a methyl group, an ethyl group, a linear or branched propyl group, a linear or branched butyl group, and a linear or branched hexyl group; these groups may optionally be further substituted with a hydroxy group, an amino group, an N-alkyl-substituted amino group, or the like.

$R^4$ is identical to the hydrocarbon group in the case in which $R^3$ is an optionally substituted hydrocarbon group having 1 to 10 carbon atoms. $R^3$ and $R^4$ may be identical or different from each other.

The optionally substituted hydrocarbon group having 1 to 10 carbon atoms represented by $R^3$ and $R^4$ preferably has 1 to 8 carbon atoms, more preferably 1 to 6 carbon atoms, and particularly preferably 1 to 5 carbon atoms.

$R^3$ and $R^4$ may be bound to each other through, or not through, a heteroatom to form a saturated ring, taken together with the nitrogen atom to which $R^3$ and $R^4$ are bound. Examples of the heteroatom include an oxygen atom, a nitrogen atom, and a sulfur atom; from the standpoint of stable structure, the heteroatom is particularly preferably an oxygen atom. The saturated ring may be, for example, a 5-membered ring or a 6-membered ring.

When $R^3$ and $R^4$ are bound to each other through, or not through, a heteroatom to form a saturated ring, taken together with the nitrogen atom to which $R^3$ and $R^4$ are bound, the saturated ring is, for example, a morpholine ring. In this case, the nitrogen atom of the morpholine ring corresponds to the nitrogen atom to which $R^3$ and $R^4$ are bound.

Specific examples of the compound represented by formula (1) include a variety of (meth)acrylamide, such as N,N-dimethyl (meth)acrylamide, 2-hydroxyethyl (meth)acrylamide, (meth)acryloyl morpholine, N,N-dimethylaminopropyl (meth)acrylamide, N,N-diethylaminoethyl (meth)acrylamide, N-isopropyl (meth)acrylamide, N-hydroxymethyl (meth)acrylamide, N-hydroxyethyl (meth)acrylamide, and N-hydroxypropyl (meth)acrylamide; and derivatives thereof.

The first polymerizable compound may be a single compound or a mixture of two or more compounds.

It appears in the composition for polymerization of the present invention that for the host-group-containing polymerizable compound to be able to dissolve in the first polymerizable compound, intermolecular hydrogen bonding of the host-group-containing polymerizable compound must be cleaved. The first polymerizable compound cleaves the hydrogen bonding to cause solvation; thus, the host-group-containing polymerizable compound can be dissolved in the first polymerizable compound. From the standpoint of the ease of cleaving hydrogen bonds, the host-group-containing polymerizable compound preferably contains a (meth)acrylamide derivative and/or a (meth)acrylic ester, and particularly preferably a (meth)acrylamide derivative.

The composition for polymerization of the present invention may further contain a guest-group-containing polymerizable compound. The guest-group-containing polymerizable compound contains a guest group and a polymerizable functional group in the molecule. In particular, the guest-group-containing polymerizable compound refers to a compound other than the first polymerizable compound.

Examples of the guest-group-containing polymerizable compound include polymerizable monomers containing a guest group and a polymerizable functional group in the molecule. The guest-group-containing polymerizable compound is not limited to a polymerizable monomer, and includes, for example, a multimer, such as a dimer and a trimer, an oligomer, and a prepolymer (all of which are polymerizable) as long as the compound contains a host group and a polymerizable functional group; the guest-group-containing polymerizable compound can also be a mixture containing two or more of these.

Examples of the type of the polymerizable functional group present in the guest-group-containing polymerizable compound are those of the polymerizable functional group present in the host-group-containing polymerizable compound described above. The polymerizable functional group present in the guest-group-containing polymerizable compound is preferably a radically polymerizable functional group; specifically, such a polymerizable functional group includes an acryloyl group ($CH_2=CH(CO)$), a methacryloyl group ($CH_2=CCH_3(CO)$), a styryl group, a vinyl group, and an allyl group. These carbon-carbon-double bond-containing groups may further optionally be substituted as long as the radically polymerizable properties are not interfered with.

The type of the guest group is not limited as long as the guest group can have host-guest interaction with the host group.

The guest group includes a linear or branched hydrocarbon group having 1 to 30 carbon atoms, a cycloalkyl group, an aryl group, a heteroaryl group, and an organometallic complex. These groups may optionally have one or more substituents or have no substituents. More specific guest groups include a chain-like, branched, or cyclic alkyl group having 4 to 18 carbon atoms. The cyclic alkyl group may have a structure like a basket. The substituents are as described above, and examples include a halogen atom (e.g., fluorine, chlorine, and bromine), a hydroxy group, a carboxy group, an ester group, an amide group, and an optionally protected hydroxy group.

Examples of the guest group also include a monovalent group formed by removing one atom (e.g., a hydrogen atom) from a guest molecule, such as at least one member selected from the group consisting of alcohol derivatives; aryl compounds; carboxylic acid derivatives; amino derivatives; azobenzene derivatives with cyclic alkyl or phenyl; cinnamic acid derivatives; aromatic compounds and alcohol derivatives thereof; amine derivatives; ferrocene derivatives; azobenzene; naphthalene derivatives; anthracene derivatives; pyrene derivatives; perylene derivatives; clusters composed of carbon atoms, such as fullerenes; and dansyl compounds.

Further specific examples of the guest group include a n-butyl group, a t-butyl group, an n-octyl group, an n-dodecyl group, a cyclohexyl group, an isobornyl group, an adamantyl group, and groups formed by binding the substituents described above to these groups (e.g., adamantyl substituted with ethyl).

Specific examples of the guest-group-containing polymerizable monomer include polymerizable vinyl monomers to which the guest group is bound. A guest-group-containing vinyl monomer is the compound represented by the following formula (g1):

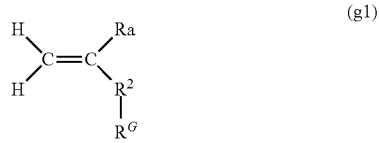

wherein Ra represents a hydrogen atom or a methyl group, $R^G$ represents the guest group, and $R^2$ is synonymous with $R^1$ of formula (h1). In formula (g1), the definition of $R^2$ is the same as that of $R^1$ in formula (h1), and the way $R^2$ is bound to the main chain (C=C bond) is also the same as the way $R^1$ in formula (h1) is bound to the main chain.

Of the polymerizable monomers represented by formula (g1), (meth)acrylic acid esters, derivatives thereof (i.e., $R^2$ is —COO—), (meth)acrylamide, and derivatives thereof (i.e., $R^2$ is —CONH— or —CONR—) are preferable. In this case, the polymerization proceeds easily, and the resulting macromolecular material is more likely to exhibit improved toughness and strength. Examples of R include a hydroxy group, an amino group, an amino group substituted with one or two alkyl groups (number of carbons: 1 to 3), a halogen atom, a carboxy group, a carbonyl group, a sulfonyl group, a sulfone group, and a cyano group.

Specific examples of the polymerizable monomer represented by formula (g1) include n-hexyl (meth)acrylate, n-octyl (meth)acrylate, n-dodecyl (meth)acrylate, adamantyl (meth)acrylate, hydroxy adamantyl (meth)acrylate, 1-(meth)acrylamide adamantane, 2-ethyl-2-adamantyl (meth)acrylate, N-dodecyl (meth)acrylamide, t-butyl (meth)acrylate, 1-acrylamide adamantane, N-(1-adamantyl) (meth)acrylamide, N-benzyl (meth)acrylamide, N-1-naphthyl methyl (meth)acrylamide, ethoxylated o-phenylphenol acrylate, phenoxy polyethylene glycol acrylate, isostearyl acrylate, nonylphenol-EO adduct acrylate, and isobornyl (meth)acrylate.

The guest-group-containing polymerizable monomer may be a single monomer or a mixture of two or more monomers.

The guest-group-containing polymerizable monomer can be produced by a known method. Alternatively, the guest-group-containing polymerizable monomer for use may be a commercially available product.

As described above, the composition for polymerization of the present invention contains the first polymerizable compound and the host-group-containing polymerizable compound as essential components, and may further contain the guest-group-containing polymerizable compound. When this solution contains the guest-group-containing polymerizable compound, the guest-group-containing polymerizable compound can also be dissolved in the solution.

Because the first polymerizable compound can dissolve the host-group-containing polymerizable compound, mixing the first polymerizable compound and the host-group-containing polymerizable compound forms a solution. As stated above, when the first polymerizable compound is a solid at room temperature (e.g., 25° C.), the first polymerizable compound can be melted to form a liquid, and the liquid is mixed with the host-group-containing polymerizable compound to form a solution.

The content of the first polymerizable compound and the host-group-containing polymerizable compound in the solution is not particularly limited. For example, from the standpoint of convenience in increasing the solubility of the host-group-containing polymerizable compound in the first polymerizable compound and increasing energy to failure of the resulting polymer, the solution contains the first polymerizable compound in an amount of 90 to 99.5 mol %, preferably 96 to 99.5 mol %, and particularly preferably 98 to 99.5 mol %, based on the total amount of the first polymerizable compound, the host-group-containing polymerizable compound, and the guest-group-containing polymerizable compound.

From the standpoint of convenience in increasing the solubility of the host-group-containing polymerizable compound in the first polymerizable compound and increasing energy to failure of the resulting polymer, the solution contains the host-group-containing polymerizable compound in an amount of 0.5 to 10 mol %, preferably 0.5 to 4 mol %, and particularly preferably 0.5 to 2 mol %, based on the total amount of the first polymerizable compound, the host-group-containing polymerizable compound, and the guest-group-containing polymerizable compound.

From the standpoint of convenience in increasing energy to failure of the resulting polymer, the solution contains the guest-group-containing polymerizable compound in an amount of 0.5 to 10 mol %, preferably 0.5 to 4 mol %, and particularly preferably 0.5 to 2 mol %, based on the total amount of the first polymerizable compound, the host-group-containing polymerizable compound, and the guest-group-containing polymerizable compound.

The composition for polymerization of the present invention may contain other additives as long as the effects of the present invention are not impaired. Examples of other additives include polymerizable monomers other than the first polymerizable compound, the host-group-containing polymerizable compound, and the guest-group-containing polymerizable compound ("other polymerizable monomer" below), known additives, such as dispersion stabilizers, surfactants, polymerization inhibitors, and light stabilizers. Such other additives may be dissolved in the solution described above, or dispersed in the solution without being dissolved in it, for example.

Examples of other polymerizable monomers include (meth)acrylic esters other than the first polymerizable compound. In particular, examples include methoxy-triethylene glycol (meth)acrylate (TEGAA), and hydroxyethyl (meth)acrylate. When these other polymerizable monomers are present, the solubility of the host-group-containing polymerizable compound is particularly increased, and the resulting polymer is provided with flexibility. The other polymerizable monomer is present, for example, in an amount of 0.1 to 50 mol %, preferably 0.2 to 40 mol %, more preferably 0.5 to 30 mol %, and particularly preferably 1 to 20 mol %, based on the total amount of the first polymerizable compound, the host-group-containing polymerizable compound, the guest-group-containing polymerizable compound, and the other polymerizable monomer.

The method for preparing the composition for polymerization of the present invention is not particularly limited, and the composition can be prepared by mixing the first polymerizable compound, the host-group-containing polymerizable compound, the guest-group-containing polymerizable compound, and other additives in a predetermined formulation.

For the composition for polymerization of the present invention, the method for preparing the solution of the first polymerizable compound and the host-group-containing polymerizable compound is also not particularly limited. For example, a solution can be prepared by mixing the first polymerizable compound and the host-group-containing polymerizable compound, optionally with stirring; this method is particularly suitable when the solubility of the host-group-containing polymerizable compound in the first polymerizable compound is excellent.

The solution of the first polymerizable compound and the host-group-containing polymerizable compound can also be prepared by heating. When the first polymerizable compound is, for example, a solid, the solution can also be prepared by heating the first polymerizable compound to its melting point or higher to form the compound into a liquid, and mixing the liquid with the host-group-containing polymerizable compound. In this case, if the temperature of the solution has decreased after heating, the first polymerizable compound may precipitate as a solid. However, re-heating the precipitate in the polymerization described later forms a first polymerizable compound solution in which the host-group-containing polymerizable compound is dissolved.

When the composition for polymerization of the present invention contains a host-group-containing polymerizable compound and a guest-group-containing polymerizable compound, the host-group-containing polymerizable compound and the guest-group-containing polymerizable compound can form a clathrate compound.

The clathrate compound can be formed, for example, after the step of subjecting the composition for polymerization containing the host-group-containing polymerizable compound and the guest-group-containing polymerizable compound to ultrasonic treatment and/or heating treatment. This step for forming a clathrate compound may be referred to as "clathrate compound formation step" below.

The clathrate compound is formed due to host-guest interaction between a host group and a guest group. Formation of such a clathrate compound makes the composition for polymerization a more homogeneous solution. This results in easily polymerizing the composition for polymerization, easily forming host-guest interaction in the resulting polymer, and easily increasing energy to failure of the resulting polymer.

The ultrasonic treatment in the clathrate compound formation step is not particularly limited. For example, a known method can be used.

The conditions for the heat treatment in the clathrate compound formation step are also not particularly limited. For example, the heating temperature is 20 to 100° C., and preferably 50 to 80° C. The heating time is 1 minute to 12 hours, and preferably 15 minutes to 1 hour. The heating means is also not particularly limited, and examples include a method using a hot stirrer, a method using a thermostat bath, and the like. It is also possible to perform the ultrasonic treatment with heating, or in place of heating.

In the clathrate compound formation step, whether a clathrate compound has been formed can be determined, for example, by visually observing the state of the composition for polymerization. Specifically, if no clathrate compound has been formed, the composition for polymerization is in the form of a suspension, or in a phase-separation state when allowed to stand. If a clathrate compound has been formed, the composition for polymerization becomes viscous, such as a form of gel or cream. Further, when a clathrate compound is formed, the composition for polymerization can become transparent.

When the first polymerizable compound of the composition for polymerization of the present invention contains a linear polymerizable polymer, such as a polymerizable oligomer or a polymerizable prepolymer, the first polymerizable compound may be present such that the first polymerizable compound penetrates the ring of the cyclodextrin, which is the host group of the host-group-containing polymerizable compound. In this case, the first polymerizable compound may penetrate one, two, or more cyclodextrins, forming "polypseudorotaxane." A polymer obtained from such a composition for polymerization exhibits further improved energy to failure. When the first polymerizable compound is even a monomer, a linear polymer formed in the monomer polymerization process may also penetrate a cyclodextrin, thus forming a polypseudorotaxane.

When the host group of the host-group-containing polymerizable compound is derived from β-cyclodextrin or γ-cyclodextrin, a linear polymer (e.g., an oligomer or a polymer of the first polymerizable compound) can easily penetrate the ring of the cyclodextrin; thus, a polypseudorotaxane is likely to be formed.

The composition for polymerization of the present invention is usable as a starting material for forming a polymer, and a polymer can be obtained by subjecting the composition for polymerization to polymerization described later.

2. Polymer and Method for Producing Polymer

The polymer according to the present invention can be formed by subjecting the composition for polymerization to polymerization. A polymer of the composition for polymerization formed in this manner is a polymer compound containing at least a first polymerizable compound unit and a host-group-containing polymerizable compound unit as constituent units. The polymer may further contain a guest-group-containing polymerizable compound unit. The "polymerizable compound unit" as used in the present specification refers to a repeating structural unit in a polymer formed when a polymerizable compound is polymerized, and does not refer to the compound itself. The "monomer unit derived from monomer A" as used in the present specification refers to a repeating structural unit that constitutes a polymer formed by polymerizing monomer A.

The conditions for polymerization of the composition for polymerization for obtaining a polymer can be selected from, for example, a wide range of the conditions for known polymerization, and the method for producing a polymer according to the present invention is not particularly limited.

In particular, the method for producing a polymer according to the present invention may comprise the step of polymerizing the composition for polymerization in the absence of a solvent for polymerization to prepare a polymer. Containing the solution formed such that the host-group-containing polymerizable compound is dissolved in the first polymerizable compound, the composition for polymerization can be subjected to polymerization without using a solvent for dissolving the host-group-containing polymerizable compound, unlike the prior art.

The composition for polymerization for use in polymerization in the method for producing a polymer according to the present invention may be those in which a clathrate compound formed in the clathrate compound formation step as described above is present. When a composition for polymerization containing a clathrate compound is used, a polymer excellent in energy to failure is easily produced because the resulting polymer is more likely to have host-guest interaction.

The polymerization can be performed in the presence of a polymerization initiator. The type of the polymerization initiator is not particularly limited, and a known polymerization initiator is usable.

Examples of polymerization initiators include ammonium persulfate (which may be referred to as "APS" below), azobisisobutyronitrile (which may be referred to as "AIBN" below), 2,2'-azobis[2-(2-imidazolin-2-yl)propane]dihydrochloride, 1,1'-azobis(cyclohexanecarbonitrile), di-tert-butyl peroxide, tert-butyl hydroperoxide, benzoyl peroxide, and photopolymerization initiators (e.g., IRGACURE (registered trademark) series).

In particular, because polymerization is performed in the absence of a solvent in the production method of the present invention, the composition for polymerization can be in the form of coating or film and subjected into polymerization. In this case, a preferable polymerization initiator for use is, for example, a photopolymerization initiator (e.g., IRGACURE (registered trademark) series).

The concentration of the polymerization initiator can be, for example, 0.5 to 5 mol %, based on the total amount of the first polymerizable compound, the host-group-containing polymerizable compound, and the guest-group-containing polymerizable compound.

When the polymerization described above is performed, other additives may also be added, if necessary. Examples of other additives include polymerization accelerators and crosslinking agents. Examples of polymerization accelerators include N,N,N',N'-tetramethylethylenediamine. The concentration of the polymerization accelerator can be, for example, 0.5 to 5 mol %, based on the total amount of the first polymerizable compound, the host-group-containing polymerizable compound, and the guest-group-containing polymerizable compound.

Polymerization can be performed under appropriate conditions according to, for example, the components of the composition for polymerization, type of polymerization initiator, and half-life temperature. For example, polymerization can be performed by agitation at a reaction temperature of 0 to 100° C., preferably 20 to 25° C. When polymerization is performed by photopolymerization, for example, with irradiation with UV light, polymerization can be performed with irradiation with UV light with a wavelength of 200 to 400 nm.

When performing polymerization, in order to increase the solubility of the host-group-containing polymerizable compound in the first polymerizable compound present in the composition for polymerization, it is preferred that the solution be heated beforehand to dissolve the host-group-containing polymerizable compound in the first polymerizable compound. When the first polymerizable compound is precipitated as a solid in the composition for polymerization, it is also preferred that heating is performed to at least the melting point of the first polymerizable compound or higher so that the first polymerizable compound transforms into a liquid, allowing the host-group-containing polymerizable compound to dissolve in the first polymerizable compound in liquid form; and that polymerization be performed with the host-group-containing polymerizable compound dissolved in the first polymerizable compound.

The time period for polymerization is not particularly limited. The reaction time can be, for example, 1 minute to 24 hours, and preferably 1 to 24 hours.

The rest of the conditions for polymerization for use can be known conditions. After polymerization has been performed, purification, drying, curing, and the like may optionally be performed.

Because a polymer can be prepared by subjecting the composition for polymerization to polymerization in the absence of a solvent in the production method of the present invention, the production method, for example, does not require the step of removing a solvent and is simple. The production method of the present invention, as described above, allows polymerization using the composition for polymerization in the form of coating, film, etc., the polymer can be formed into various shapes, such as a coating, a film, or a sheet.

Additionally, because a polymer is prepared by polymerization in the absence of a solvent, the polymer is not affected by the solvent (e.g., plasticizing effect) and is excellent in toughness and strength; thus, the polymer exhibits excellent energy to failure.

The polymer of the composition for polymerization of the present invention has such a structure that a host group derived from the host-group-containing polymerizable compound is present in the molecule. The polymer of the composition for polymerization is formed by polymerization between the first polymerizable compound and the host-group-containing polymerizable compound. This polymer can become, for example, a random copolymer between them, or may have a polypseudorotaxane structure. The polypseudorotaxane can have such a structure that a linear polymer formed by polymerization of the first polymerizable compound penetrates the ring of the host group, like a skewer. This case is likely to exhibit particularly improved energy to failure. Thus, a polymer of the composition for polymerization of the present invention (i.e., a host-group-containing polymer) exhibits, for example, high rupture strength under tensile stress and excellent elongation properties, thus having high energy to failure.

Additionally, the host-group-containing polymer can form a composite with a polymer containing a guest group. Because such a composite polymer can form, for example, host-guest interaction, the composite polymer may exhibit high rupture strength and improved elongation properties; thus, the composite polymer may further be able to have higher energy to failure.

A polymer prepared by using a composition for polymerization containing the guest-group-containing polymerizable compound in addition to the host-group-containing polymerizable compound (a copolymer of a mixture containing a host-group-containing polymerizable compound and a guest-group-containing polymerizable compound) has such a structure that a host group derived from the host-group-containing polymerizable compound is present in the molecule, and that a guest group derived from the guest-group-containing polymerizable compound is present in the molecule. In this case, host-guest interaction occurs between polymers, thus forming a crosslinked structure in which the polymers are crosslinked. This leads to a polymer that can exhibit excellent rupture strength and elongation properties, and that may exhibit particularly improved energy to failure.

In the composition for polymerization and the production method according to the present invention, preferable combinations of a host group and a guest group are such that when the host group is derived from α-cyclodextrin, the guest group is preferably at least one member selected from the group consisting of a n-butyl group, a n-hexyl group, a n-octyl group, and a n-dodecyl group. When the host molecule that constitutes the host group is a group derived from β-cyclodextrin, the guest group is preferably at least one member selected from the group consisting of an adamantyl group and an isobornyl group. When the host molecule that constitutes the host group is a group derived from γ-cyclodextrin, the group is preferably a n-octyl group, a n-dodecyl group, a cyclododecyl group, or the like.

To form such combinations of a host group and a guest group, the host-group-containing polymerizable compound and the guest-group-containing polymerizable compound to be contained in the composition for polymerization are selected to match such combinations.

Polymers that can have host-guest interaction as describe above exhibit improved energy to failure and can also exhibit a self-restorable function due to the reversibility of host-guest interaction.

When the polymer is one obtained by using a composition for polymerization containing the compound represented by formula (h1), the host group is bound to $R^1$ via —O—$CH_2$— ("linker" below). Specifically, the host group is bound to the oxygen atom of the linker, and one end of $R^1$ is bound to the carbon atom of the linker. Because the host group $R^H$ is bound to the side chain via this linker, the host group $R^H$ has a higher degree of freedom than without the linker. This high degree of freedom of the host group $R^H$ makes it likely for the host group and the guest group to have host-guest interaction. This results in easily forming a crosslinked polymer, stabilizing the structure of the polymer, and thus achieving remarkably improved toughness and strength.

One of the reasons for this great toughness and strength is a high degree of freedom of the host group bound via a linker. More specifically, due to the high degree of freedom of the host group, the dissociation of host-guest interaction is unlikely to occur, thereby enhancing the toughness of the polymer and thus providing the polymer with high strength.

The polymer of the present invention alone or in a combination with other materials can form various macromolecular materials. Such macromolecular materials are excellent in energy to failure, and can be suitably used, for example, in various parts, such as for automobiles, electronic parts, building materials, food containers, and transport containers.

The shape of the macromolecular material is not particularly limited. For example, the macromolecular material can be formed into a membrane, a film, a sheet, a particle, a plate, a block, a pellet, a powder, or the like.

EXAMPLES

The following describes the present invention in more detail with reference to Examples. However, the present invention is not limited to the embodiments of these Examples.

Production Example 1: Production of Acrylamide Methyl α-Cyclodextrin

Figure 5:
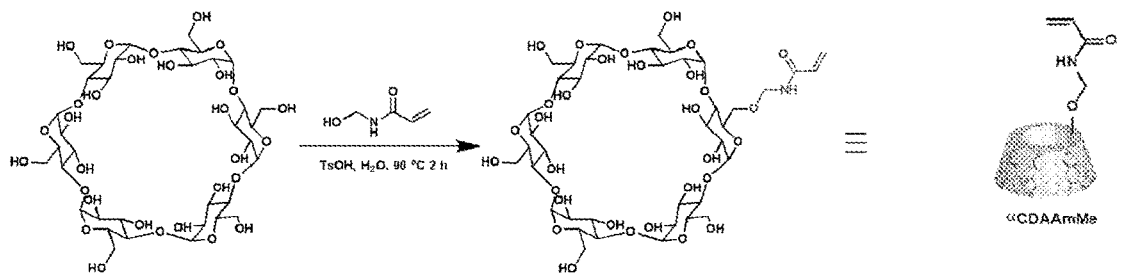
FIG. 5 shows reaction scheme (6-1)—production of Acrylamide methyl α-cyclodextrin (α-CDAAmMe)—and reaction scheme (6-2)—production of Acrylamide methyl β-cyclodextrin (β-CDAAmMe).
Figure 5:
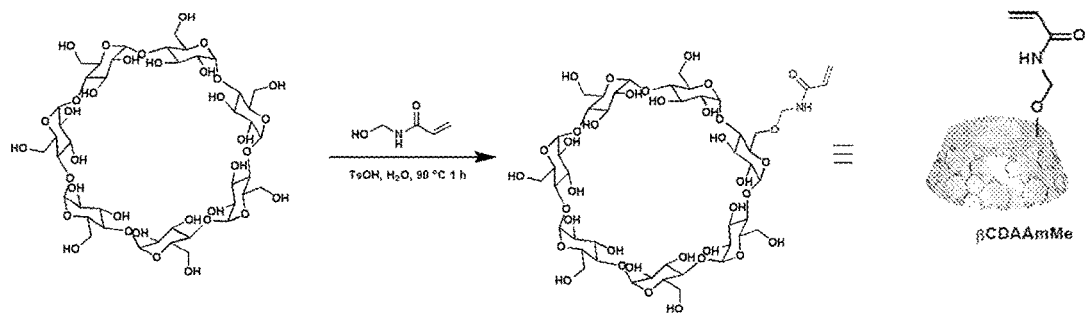

Acrylamide methyl α-cyclodextrin (α-CDAAmMe) was produced in accordance with the reaction scheme (6-1) (FIG. 5).

20 g (20 mmol) of α-cyclodextrin, 2 g (20 mmol) of N-hydroxymethyl acrylamide, and 190 mg (1 mmol, 10 mol %) of p-toluenesulfonic acid monohydrate were weighed and placed in a 300-mL round-bottom flask, and these were then added to 50 mL of N,N-dimethylformamide, thereby preparing a mixture. This mixture was heated to 90° C. in an oil bath and heated with stirring for 1 hour. Subsequently, the reaction solution was cooled and added to 500 mL of strongly stirred acetone. The generated precipitates were filtered off and washed with 100 mL of acetone three times, followed by drying under reduced pressure at room temperature (20° C.; the same applies below) for 1 hour, thereby obtaining a reaction product. The reaction product was dissolved in 500 mL of distilled water and passed through a column packed with a porous polystyrene resin (Mitsubishi Chemical Corporation, Diaion HP-20) (apparent density: 600 g/L) to allow for adsorption for 30 minutes. Instead of this column, preparative high-pressure liquid chromatography was used to perform separation and purification in some cases. Thereafter, the solution component was removed, and 500 mL of distilled water was further passed through the column twice to wash the polystyrene resin, thereby removing unreacted α-cyclodextrin. Subsequently, 500 mL of a 30% methanol (or acetonitrile) aqueous solution was passed through the column twice to elute α-CDAAmMe, which was the target product. The solvent was removed under reduced pressure, thereby obtaining 2.1 g of a white powder. The yield was about 10%.

Production Example 2: Production of Acrylamide Methyl β-Cyclodextrin

Acrylamide methyl β-cyclodextrin (β-CDAAmMe) was produced in accordance with the reaction scheme (6-2) (FIG. 5).

15 g (15 mmol) of β-cyclodextrin, 2 g (22.5 mmol) of N-hydroxymethyl acrylamide, and 500 mg (2.6 mmol, 1 wt %) of p-toluenesulfonic acid monohydrate were weighed and placed in a 200-mL round-bottom glass flask, and these were added to 50 mL of N,N-dimethylformamide, thereby preparing a mixture. The mixture was heated at 90° C. in an oil bath, and heated with stirring for 1 hour, thereby obtaining a reaction solution. Subsequently, the reaction solution was cooled, and poured to 45 mL of strongly stirred acetone. The generated precipitates were filtered off and washed with 10 mL of acetone three times, followed by drying under reduced pressure at room temperature for 1 hour, thereby obtaining a reaction product. The reaction product was dissolved in 100 mL of distilled water and passed through a column packed with a porous polystyrene resin (Mitsubishi Chemical Corporation: Diaion HP-20) (apparent density: 600 g/L) to allow for adsorption for 30 minutes. Instead of the column, preparative high-pressure liquid chromatography was used to perform separation and purification in some cases. Thereafter, the solution component was removed, and 50 mL of a 10% methanol (or acetonitrile) aqueous solution was further passed through the column three times to wash the polystyrene resin, thereby removing unreacted β-cyclodextrin. Subsequently, 500 mL of a 25% methanol aqueous solution was passed through the column twice to elute β-CDAAmMe, which was the target product. The solvent was removed under reduced pressure, thereby obtaining 156 mg of a white powder. The yield was about 13%.

Production Example 3: Production of Acrylamide Methyl γ-Cyclodextrin 5 g (5 mmol) of γ-cyclodextrin, 700 mg (1.3 mmol) of N-hydroxymethyl acrylamide, and 95 mg (0.5 mmol) of p-toluenesulfonic acid monohydrate were weighed and placed in a 200-mL round-bottom glass flask, and these were added to 25 mL of N,N-dimethylformamide, thereby preparing a mixture. The mixture was heated to 90° C. in an oil bath and heated with stirring for 1 hour, thereby obtaining a reaction solution. Subsequently, the reaction solution was cooled and poured to 45 mL of strongly stirred acetone. The generated precipitates were filtered off and washed with 10 mL of acetone three times, followed by drying under reduced pressure at room temperature for 1 hour, thereby obtaining a reaction product. The reaction product was dissolved in 100 mL of distilled water and passed through a column packed with a porous polystyrene resin (Mitsubishi Chemical Corporation: Diaion HP-20) (apparent density: 600 g/L) to allow for adsorption for 30 minutes. Instead of the column, preparative high-pressure liquid chromatography was used to perform separation and purification in some cases. Thereafter, the solution component was removed, and 50 mL of a 10% methanol (or acetonitrile) aqueous solution was further passed through the column three times to wash the polystyrene resin, thereby removing unreacted γ-cyclodextrin. Subsequently, 500 mL of a 25% methanol aqueous solution was passed through the column twice to elute acrylamide methyl γ-cyclodextrin (γ-CDAAmMe), which was the target product. The solvent was removed under reduced pressure, thereby obtaining 809 mg of a white powder. The yield was about 15%.

Example 1-1

Figure 6:
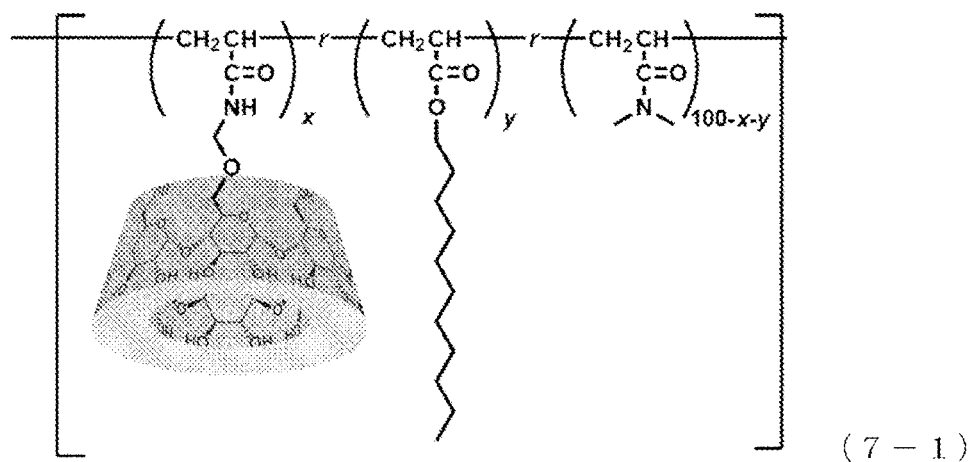
FIG. 6 shows graphical representations of polymers having a repeating unit represented by formula (7-1), formula (8-1), formula (8-2), formula (8-3), formula (9-1), formula (9-2), formula (10-1), formula (10-2), formula (10-3), and formula (10-4).
Figure 6:
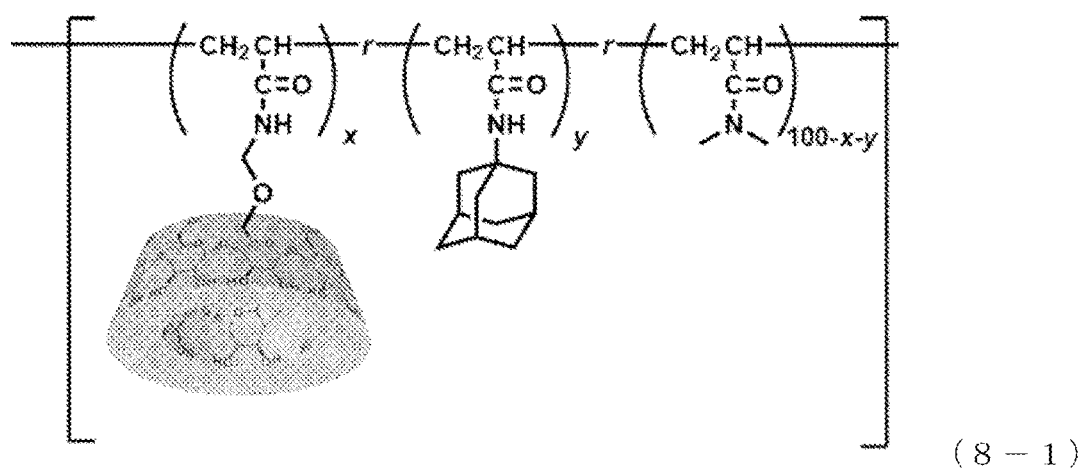
Figure 6:
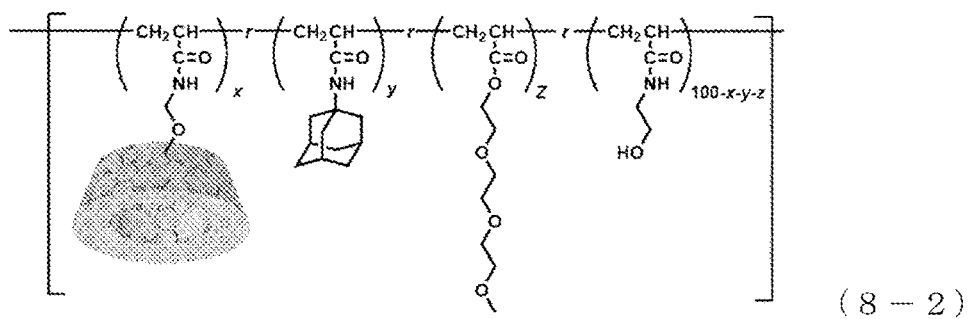
Figure 6:
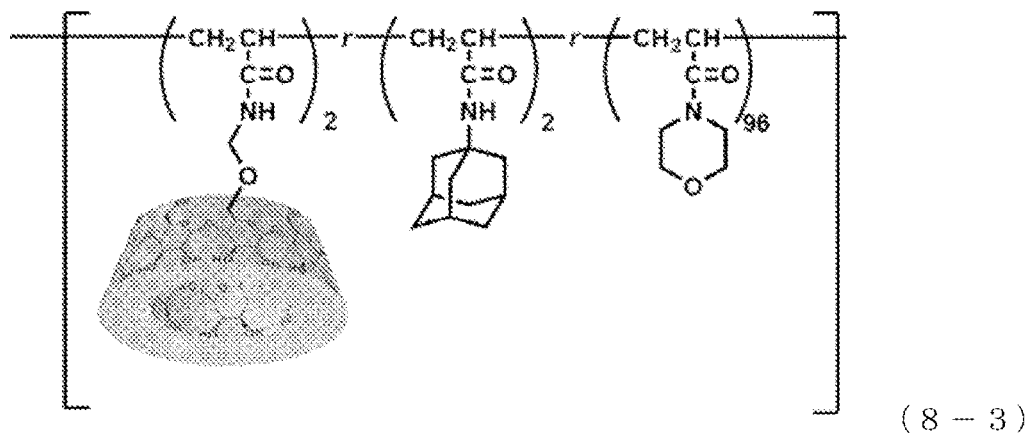
Figure 6:
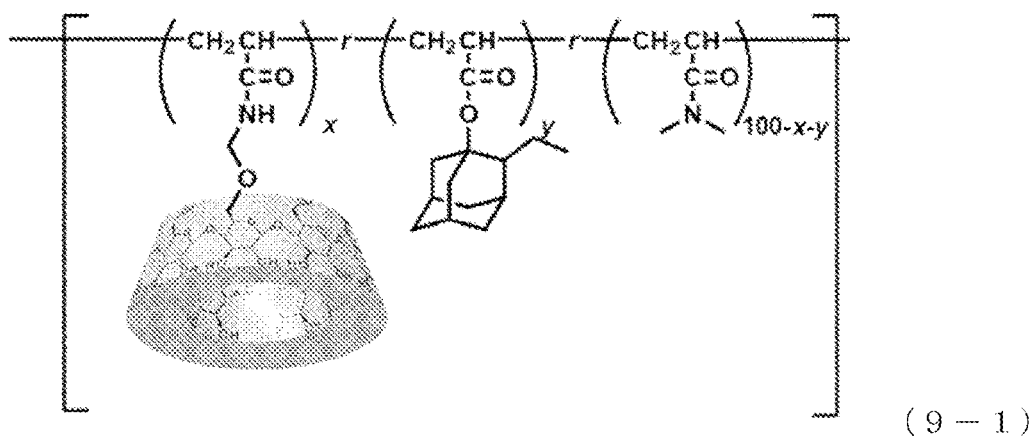
Figure 6:
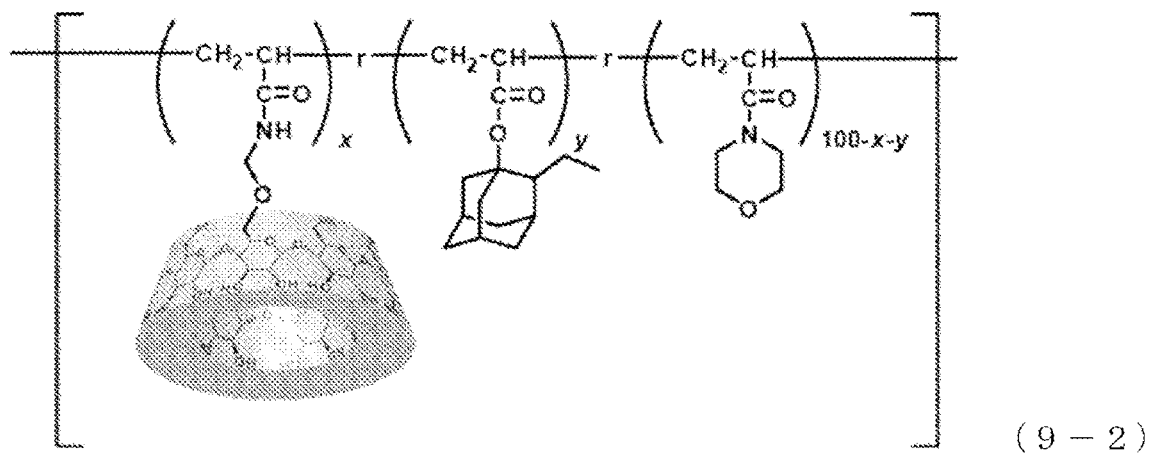
Figure 6:
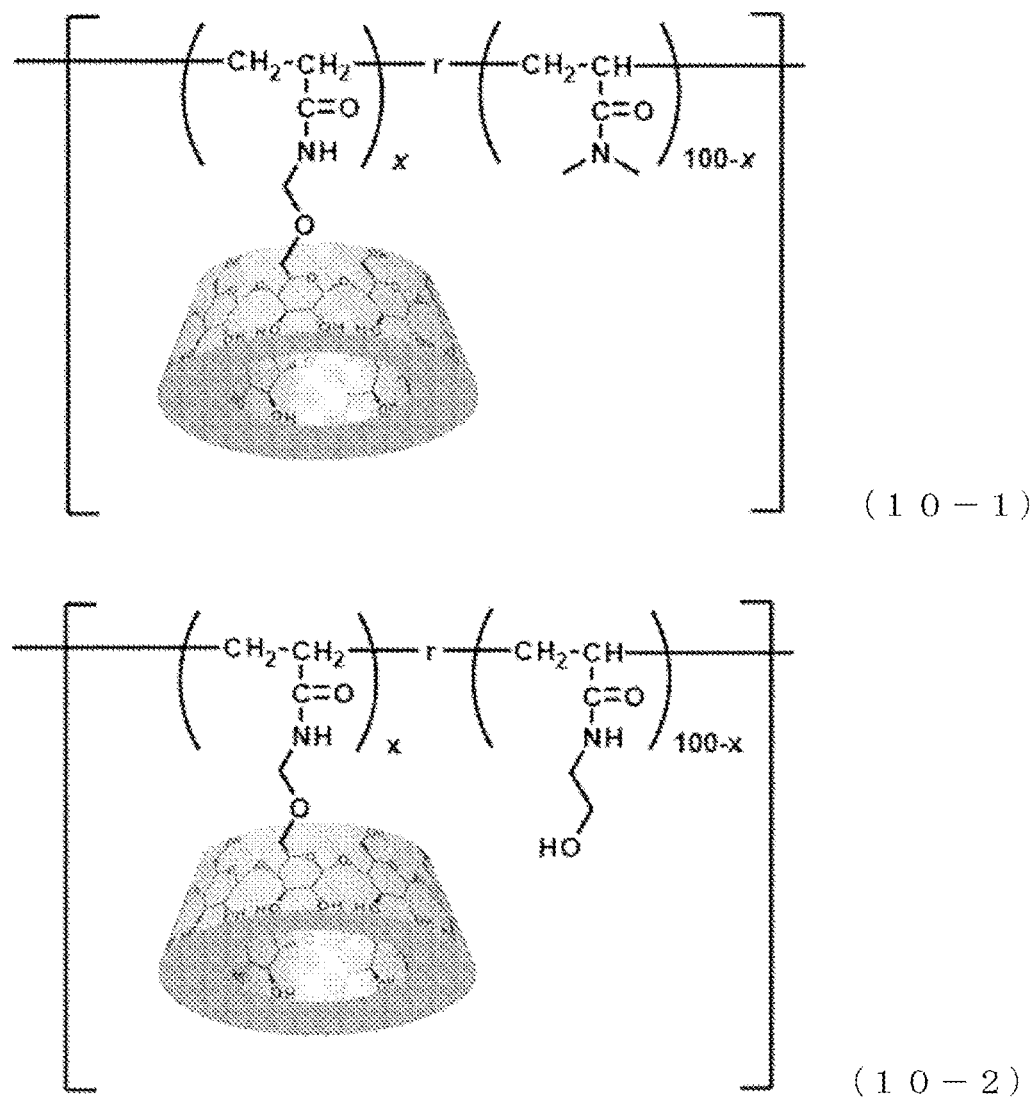
Figure 6:
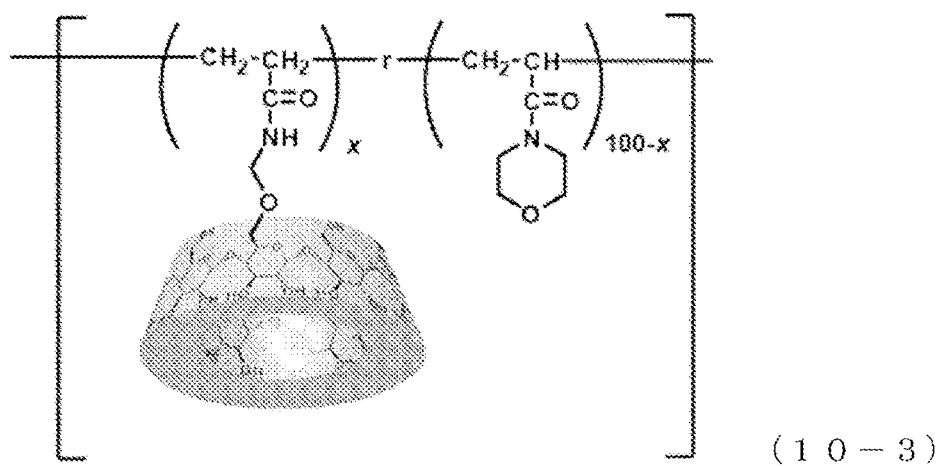
Figure 6:
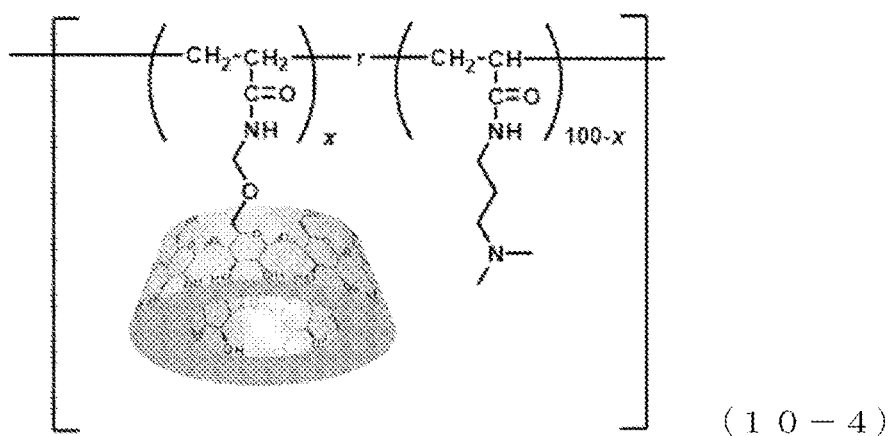

A polymer having the repeating unit represented by the formula (7-1) (FIG. 6) was produced. In the scheme, "-r-" indicates a "random copolymer," in which the repeating structural units are randomly arranged. The same applies below.

αCDAAmMe (the host-group-containing polymerizable compound obtained in Production Example 1), dodecyl acrylate (Dod-AA) (a guest-group-containing polymerizable compound), and N,N-dimethyl acrylamide (a first polymerizable compound) were mixed such that the amount of αCDAAmMe was x mol %, the amount of Dod-AA was y mol %, and the amount of N,N-dimethyl acrylamide was 100-x-y mol %, thereby preparing a solution. This solution was exposed to ultrasound for 1 hour, thereby preparing a composition for polymerization. Subsequently, IRGACURE 184 (registered trademark, a polymerization initiator) in an amount of 1 mol % based on the total mol of all of the polymerizable compounds was added to the composition for polymerization, followed by forming a coating film of the composition for polymerization on a polypropylene film substrate. This coating film was irradiated with ultraviolet light at 365 nm to perform polymerization of the composition for polymerization, followed by drying in a vacuum oven, thereby obtaining a polymer. This polymer is expressed as αCD-Dod PDMAA(x,y). In Example 1-1, x=0.5, and y=0.5.

Example 1-2

A polymer was obtained in the same manner as in Example 1-1, except that x=0.5, and y=0.

Comparative Example 1-1

A polymer was obtained in the same manner as in Example 1-1, except that x=0, and y=0.5.

Example 2-1

A polymer represented by the formula (8-1) (FIG. 6) was produced.
βCDAAmMe (the host-group-containing polymerizable compound obtained in Production Example 2), adamantane acrylamide (Ad-AAm) (a guest-group-containing polymerizable compound), and N,N-dimethyl acrylamide (a first polymerizable compound) were mixed such that the amount of βCDAAmMe was x mol %, the amount of Ad-AAm was y mol %, and the amount of N,N-dimethyl acrylamide was 100-x-y mol %, thereby preparing a solution. This solution was exposed to ultrasound for 1 hour, thereby preparing a composition for polymerization. Subsequently, IRGACURE 184 (registered trademark, a polymerization initiator) in an amount of 1 mol % based on the total mol of all of the polymerizable compounds was added to the composition for polymerization, followed by forming a coating film of the composition for polymerization on a glass substrate. This coating film was irradiated with ultraviolet light at 365 nm to perform polymerization of the composition for polymerization, followed by drying in a vacuum oven, thereby obtaining a polymer. This polymer is expressed as βCD-Ad PDMAA(x,y). In Example 2-1, x=1, and y=1.

Example 2-2

A polymer was obtained in the same manner as in Example 2-1, except that x=1, and y=0.

Example 2-2-1

A polymer was obtained in the same manner as in Example 2-1, except that x=2, and y=2.

Comparative Example 2-1

A polymer was obtained in the same manner as in Example 2-1, except that x=0, and y=1.

Example 2-3

A polymer represented by the formula (8-2) (FIG. 6) was produced.
βCDAAmMe (the host-group-containing polymerizable compound obtained in Production Example 2), adamantane acrylamide (Ad-AAm) (a guest-group-containing polymerizable compound), methoxy-triethylene glycol acrylate (TEGAA), and hydroxyethyl acrylamide (a first polymerizable compound) were mixed such that the amount of βCDAAmMe was x mol %, the amount of Ad-AAm was y mol %, the amount of methoxy-triethylene glycol acrylate was z mol %, and the amount of hydroxyethyl acrylamide was 100-x-y-z mol %, thereby preparing a solution. This solution was exposed to ultrasound for 1 hour, thereby preparing a composition for polymerization. Subsequently, IRGACURE 184 (registered trademark, a polymerization initiator) in an amount of 1 mol % based on the total mol of all of the polymerizable compounds was added to the composition for polymerization, followed by forming a coating film of the composition for polymerization on a glass substrate. This coating film was irradiated with ultraviolet light at 365 nm to perform polymerization of the composition for polymerization, followed by drying in a vacuum oven, thereby obtaining a polymer. This polymer is expressed as βCD-AdAAm-TEGA-HEAA(x,y,z). In Example 2-3, x=1, y=1, and z=20.

Example 2-4

A polymer was obtained in the same manner as in Example 2-3, except that x=1, y=0, and z=20.

Comparative Example 2-2

A polymer was obtained in the same manner as in Example 2-3, except that x=0, y=1, and z=20.

Comparative Example 2-3

A polymer was obtained in the same manner as in Example 2-3, except that x=0, y=0, and z=20.

Comparative Example 2-4

Methylenebisacrylamide and N,N-dimethyl acrylamide were mixed such that the amount of methylenebisacrylamide was 0.5 mol %, and the amount of N,N-dimethyl acrylamide was 99.5%, and this mixture was exposed to ultrasound for 1 hour, thereby preparing a composition for polymerization. Subsequently, IRGACURE 184 (registered trademark, a polymerization initiator) in an amount of 1 mol % based on the total mol of all of the polymerizable compounds was added to the composition for polymerization, followed by forming a coating film of the composition for polymerization on a glass substrate. This coating film was irradiated with ultraviolet light at 365 nm to perform polymerization of the composition for polymerization, followed by drying in a vacuum oven, thereby obtaining a polymer.

Example 2-5

A polymer represented by the formula (8-3) (FIG. 6) was produced.

βCDAAmMe (the host-group-containing polymerizable compound obtained in Production Example 2), adamantane acrylamide (Ad-AAm) (a guest-group-containing polymerizable compound), and acryloyl morpholine (a first polymerizable compound) were mixed such that the amount of βCDAAmMe was x mol %, the amount of Ad-AAm was y mol %, and the amount of acryloyl morpholine was 100-x-y mol %, thereby preparing a solution. This solution was exposed to ultrasound for 1 hour, thereby preparing a composition for polymerization. Subsequently, IRGACURE 184 (registered trademark, a polymerization initiator) in an amount of 1 mol % based on the total mol of all of the polymerizable compounds was added to the composition for polymerization, followed by forming a coating film of the composition for polymerization on a glass substrate. This coating film was irradiated with ultraviolet light at 365 nm to perform polymerization of the composition for polymerization, followed by drying in a vacuum oven, thereby obtaining a polymer. This polymer is expressed as βCD-AdAAm-ACMO(x,y). In Example 2-5, x=2, and y=2.

Example 2-5-1

A polymer was obtained in the same manner as in Example 2-5, except that x=3, and y=3.

Example 2-5-2

A polymer was obtained in the same manner as in Example 2-5, except that x=4, and y=4.

Example 2-6

A polymer was obtained in the same manner as in Example 2-5, except that x=2, and y=0.

Example 2-7-1

βCDAAmMe (the host-group-containing polymerizable compound obtained in Production Example 2), adamantane acrylamide (Ad-AAm) (a guest-group-containing polymerizable compound), and hydroxyethyl acrylamide (a first polymerizable compound) were mixed such that the amount of βCDAAmMe was x mol %, the amount of Ad-AAm was y mol %, and the amount of hydroxyethyl acrylamide was 100-x-y mol %, thereby preparing a solution. This solution was exposed to ultrasound for 1 hour, thereby preparing a composition for polymerization. Subsequently, IRGACURE 184 (registered trademark, a polymerization initiator) in an amount of 1 mol % based on the total mol of all of the polymerizable compounds was added to the composition for polymerization, followed by forming a coating film of the composition for polymerization on a glass substrate. This coating film was irradiated with ultraviolet light at 365 nm to perform polymerization of the composition for polymerization, followed by drying in a vacuum oven, thereby obtaining a polymer. This polymer is expressed as βCD-AdAAm-HEAA(x,y). In Example 2-7-1, x=2, and y=2.

Example 2-7-2

A polymer was obtained in the same manner as in Example 2-7-1, except that x=3, and y=3.

Example 2-7-3

A polymer was obtained in the same manner as in Example 2-7-1, except that x=4, and y=4.

Example 2-7-4

A polymer was obtained in the same manner as in Example 2-7-1, except that x=5, and y=5.

Example 3-1

A polymer represented by the formula (9-1) (FIG. 6) was produced.

γCDAAmMe (the host-group-containing polymerizable compound obtained in Production Example 3), ethyl adamantyl acrylate (EtAd-AAm) (a guest-group-containing polymerizable compound), and N,N-dimethyl acrylamide (a first polymerizable compound) were mixed such that the amount of γCDAAmMe was x mol %, the amount of EtAd-AAm was y mol %, and the amount of N,N-dimethyl acrylamide was 100-x-y mol %, thereby preparing a solution. This solution was exposed to ultrasound for 1 hour, thereby preparing a composition for polymerization. Subsequently, IRGACURE 184 (registered trademark, a polymerization initiator) in an amount of 1 mol % based on the total mol of all of the polymerizable compounds was added to the composition for polymerization, followed by forming a coating film of the composition for polymerization on a glass substrate. This coating film was irradiated with ultraviolet light at 365 nm to perform polymerization of the composition for polymerization, followed by drying in a vacuum oven, thereby obtaining a polymer. This polymer is expressed as βCD-Ad PDMAA(x,y). In Example 3-1, x=1, and y=1.

Example 3-2

A polymer was obtained in the same manner as in Example 3-1, except that x=1, and y=0.

Example 3-3

A polymer was obtained in the same manner as in Example 3-1, except that x=2, and y=2.

Example 3-4

A polymer was obtained in the same manner as in Example 3-1, except that x=2, and y=0.

Comparative Example 3-1

A polymer was obtained in the same manner as in Example 3-1, except that x=0, and y=1.

Comparative Example 3-2

A polymer was obtained in the same manner as in Example 3-1, except that x=0, and y=2.

Comparative Example 3-3

Methylenebisacrylamide and N,N-dimethyl acrylamide were mixed such that the amount of methylenebisacrylamide was 1 mol %, and the amount of N,N-dimethyl acrylamide was 99%. This mixture was exposed to ultrasound for 1 hour, thereby preparing a composition for polymerization. Subsequently, IRGACURE 184 (registered trademark, a polymerization initiator) in an amount of 1 mol % based on the total mol of all of the polymerizable compounds was added to the composition for polymerization, followed by forming a coating film of the composition for polymerization on a glass substrate. This coating film was irradiated with ultraviolet light at 365 nm to perform polymerization of the composition for polymerization, followed by drying in a vacuum oven, thereby obtaining a polymer.

Comparative Example 3-4

A polymer was obtained in the same manner as in Comparative Example 3-2, except that methylenebisacrylamide and N,N-dimethyl acrylamide were mixed such that the amount of methylenebisacrylamide was 2 mol %, and the amount of N,N-dimethyl acrylamide was 98%.

Example 4-1

A polymer represented by the formula (9-2) (FIG. 6) was produced.

γCDAAmMe (the host-group-containing polymerizable compound obtained in Production Example 3), ethyl adamantyl acrylate (EtAd-AAm) (a guest-group-containing polymerizable compound), and acryloyl morpholine (a first polymerizable compound) were mixed such that the amount of γCDAAmMe was x mol %, the amount of EtAd-AAm was y mol %, and the amount of acryloyl morpholine was 100-x-y mol %, thereby preparing a solution. This solution was exposed to ultrasound for 1 hour, thereby preparing a composition for polymerization. Subsequently, IRGACURE 184 (registered trademark, a polymerization initiator) in an amount of 1 mol % based on the total mol of all of the polymerizable compounds was added to the composition for polymerization, followed by forming a coating film of the composition for polymerization on a glass substrate. This coating film was irradiated with ultraviolet light at 365 nm to perform polymerization of the composition for polymerization, followed by drying in a vacuum oven, thereby obtaining a polymer. This polymer is expressed as γCD-Ad PACMO(x,y). In Example 4-1, x=1, and y=1. The obtained polymer had a water swelling percentage of about 700%.

Example 4-2

A polymer was obtained in the same manner as in Example 4-1, except that x=1, and y=0. The obtained polymer had a water swelling percentage of about 900%.

Comparative Example 4-1

Methylenebisacrylamide and acryloyl morpholine were mixed such that the amount of methylenebisacrylamide was 1 mol % and the amount of acryloyl morpholine was 99%. This mixture was exposed to ultrasound for 1 hour, thereby obtaining a composition for polymerization. Subsequently, IRGACURE 184 (registered trademark, a polymerization initiator) in an amount of 1 mol % based on the total mol of all of the polymerizable compounds was added to the composition for polymerization, followed by forming a coating film of the composition for polymerization on a glass substrate. This coating film was irradiated with ultraviolet light at 365 nm to perform polymerization of the composition for polymerization, followed by drying in a vacuum oven, thereby obtaining a polymer. The obtained polymer had a water swelling percentage of about 300%.

Example 5-1

A polymer represented by the formula (10-1) (FIG. 6) was produced.

αCDAAmMe (the host-group-containing polymerizable compound obtained in Production Example 1) and N,N-dimethyl acrylamide (a first polymerizable compound) were mixed such that the amount of αCDAAmMe was x mol %, and the amount of N,N-dimethyl acrylamide was 100-x mol %, thereby preparing a solution. This solution was exposed to ultrasound for 1 hour, thereby preparing a composition for polymerization. Subsequently, IRGACURE 184 (registered trademark, a polymerization initiator) in an amount of 1 mol % based on the total mol of all of the polymerizable compounds was added to the composition for polymerization, followed by forming a coating film of the composition for polymerization on a glass substrate. This coating film was irradiated with ultraviolet light at 365 nm to perform polymerization of the composition for polymerization, followed by drying in a vacuum oven, thereby obtaining a polymer. This polymer is expressed as γCD PACMO(x). In Example 5-1, x=1. The obtained polymer had a water swelling percentage of about 2400%.

Example 5-2

A polymer was obtained in the same manner as in Example 5-1, except that the βCDAAmMe obtained in Production Example 2 was used as a host-group-containing polymerizable compound. The obtained polymer had a water swelling percentage of about 6400%.

Example 5-3

A polymer was obtained in the same manner as in Example 5-1, except that the γCDAAmMe obtained in Production Example 3 was used as a host-group-containing polymerizable compound. The obtained polymer had a water swelling percentage of about 300%.

Example 6-1

A polymer represented by the formula (10-2) (FIG. 6) was produced.

αCDAAmMe (the host-group-containing polymerizable compound obtained in Production Example 1) and hydroxyethyl acrylamide (a first polymerizable compound) were mixed such that the amount of αCDAAmMe was x mol % and the amount of hydroxyethyl acrylamide was 100-x mol %, thereby preparing a solution. This solution was exposed to ultrasound for 1 hour, thereby preparing a composition for polymerization. Subsequently, IRGACURE 184 (registered trademark, a polymerization initiator) in an amount of 1 mol % based on the total mol of all of the polymerizable compounds was added to the composition for polymerization, followed by forming a coating film of the composition for polymerization on a glass substrate. This coating film was irradiated with ultraviolet light at 365 nm to perform polymerization of the composition for polymerization, followed by drying in a vacuum oven, thereby obtaining a polymer. This polymer is expressed as γCD PACMO(x). In Example 6-1, x=1. The obtained polymer had a water swelling percentage of about 1100%.

Example 6-2

A polymer was obtained in the same manner as in Example 6-1, except that the βCDAAmMe obtained in Production Example 2 was used as a host-group-containing polymerizable compound. The obtained polymer had a water swelling percentage of about 1200%.

Example 6-3

A polymer was obtained in the same manner as in Example 6-1, except that the γCDAAmMe obtained in Production Example 3 was used as a host-group-containing polymerizable compound. The obtained polymer had a water swelling percentage of about 800%.

Example 7-1

A polymer represented by the formula (10-3) (FIG. 6) was produced.
αCDAAmMe (the host-group-containing polymerizable compound obtained in Production Example 1) and acryloyl morpholine (a first polymerizable compound) were mixed such that the amount of αCDAAmMe was x mol % and the amount of acryloyl morpholine was 100-x mol %, thereby preparing a solution. This solution was exposed to ultrasound for 1 hour, thereby preparing a composition for polymerization. Subsequently, IRGACURE 184 (registered trademark, a polymerization initiator) in an amount of 1 mol % based on the total mol of all of the polymerizable compounds was added to the composition for polymerization, followed by forming a coating film of the composition for polymerization on a glass substrate. This coating film was irradiated with ultraviolet light at 365 nm to perform polymerization of the composition for polymerization, followed by drying in a vacuum oven, thereby obtaining a polymer. This polymer is expressed as γCD PACMO(x). In Example 7-1, x=1. The obtained polymer had a water swelling percentage of about 2200%.

Example 7-2

A polymer was obtained in the same manner as in Example 7-1, except that the βCDAAmMe obtained in Production Example 2 was used as a host-group-containing polymerizable compound. The obtained polymer had a water swelling percentage of about 2200%.

Example 7-3

A polymer was obtained in the same manner as in Example 7-1, except that the γCDAAmMe obtained in Production Example 3 was used as a host-group-containing polymerizable compound. The obtained polymer had a water swelling percentage of about 700%.

Example 8-1

A polymer represented by the formula (10-4) (FIG. 6) was produced.
αCDAAmMe (the host-group-containing polymerizable compound obtained in Production Example 1) and N,N-dimethylaminopropyl acrylamide (a first polymerizable compound) were mixed such that the amount of αCDAAmMe was x mol % and the amount of N,N-dimethylaminopropyl acrylamide was 100-x mol %, thereby preparing a solution. This solution was exposed to ultrasound for 1 hour, thereby preparing a composition for polymerization. Subsequently, IRGACURE 184 (registered trademark, a polymerization initiator) in an amount of 1 mol % based on the total mol of all of the polymerizable compounds was added to the composition for polymerization, followed by forming a coating film of the composition for polymerization on a glass substrate. This coating film was irradiated with ultraviolet light at 365 nm to perform polymerization of the composition for polymerization, followed by drying in a vacuum oven, thereby obtaining a polymer. This polymer is expressed as γCD PACMO(x). In Example 8-1, x=1.

Example 8-2

A polymer was obtained in the same manner as in Example 8-1, except that the βCDAAmMe obtained in Production Example 2 was used as a host-group-containing polymerizable compound.

Example 8-3

A polymer was obtained in the same manner as in Example 8-1, except that the γCDAAmMe obtained in Production Example 3 was used as a host-group-containing polymerizable compound.

Tensile Test

The polymers (thickness: 1 mm) obtained in the Examples and Comparative Examples were subjected to a tensile-load curve test (Autograph AGX-plus produced by Shimadzu Corporation), and the rupture point of the polymers was observed. With this rupture point taken as the final point, the maximum stress applied until the final point was determined to be the stress-strain of a polymer. This tensile test was performed with the bottom end of a polymer fixed, and the upper end pulled at a tension rate of 0.1 to 1 nm/min (upward operation) at a measurement temperature of 139° C. The stroke at the time of rupture (i.e., the maximum length of the pulled polymer) was divided by the length of the polymer before being pulled, and the resulting value was determined to be the degree of stretching.

Figure 3:
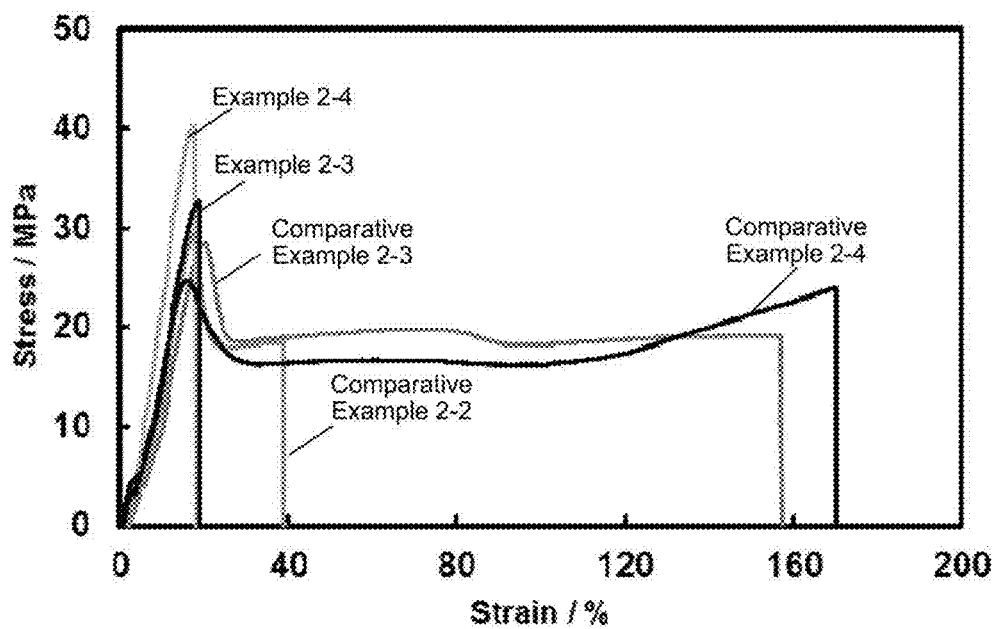
FIG. 3 shows the results of a tensile test on the polymers obtained in Examples and Comparative Examples.
Figure 4:
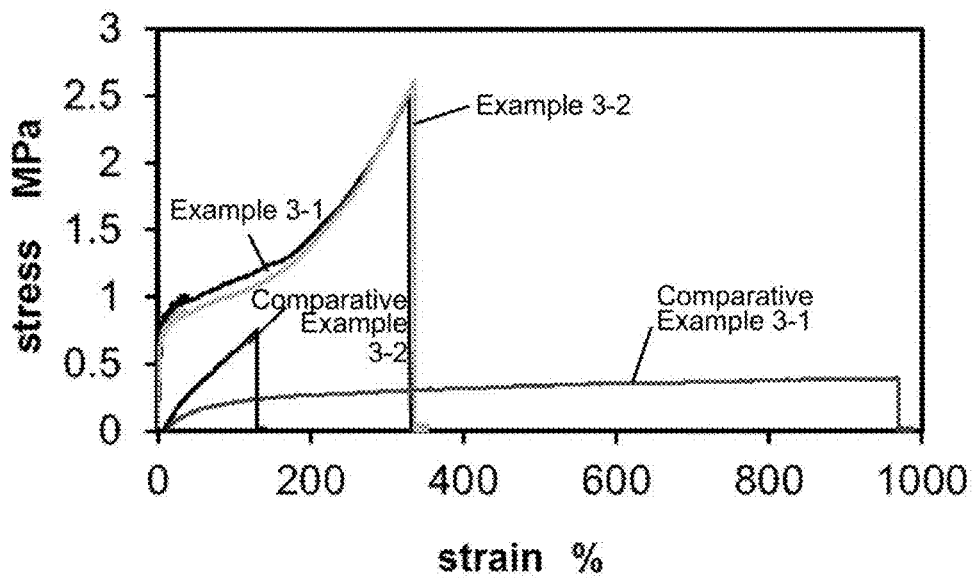
FIG. 4 shows the results of a tensile test on the polymers obtained in Examples and Comparative Examples.
Figure 4:
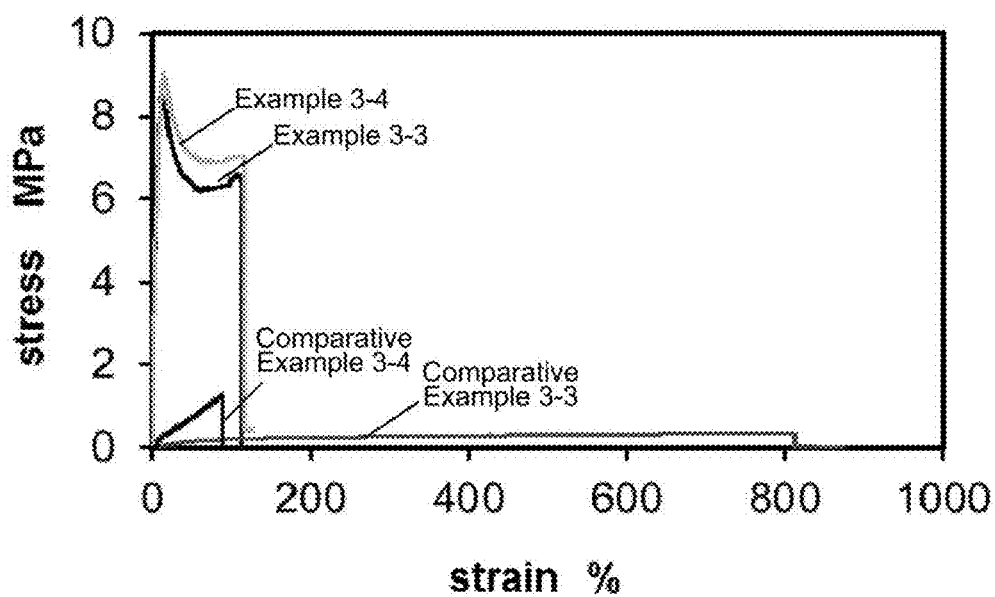

FIG. 1 shows the results of the tensile test on the polymers of Examples 1-1 and 1-2. FIG. 1 shows the results of the tensile test on the polymers of Examples 2-1 and 2-2, and the polymer of Comparative Example 2-1. FIG. 3 shows the results of the tensile test on the polymers of Examples 2-3 and 2-4 and the polymers of Comparative Examples 2-2, 2-3, and 2-4. FIG. 4(a) shows the results of the tensile test on the polymers of Examples 3-1 and 3-2 and the polymers of Comparative Examples 3-1 and 3-2. FIG. 4(b) shows the results of the tensile test on the polymers of Examples 3-3 and 3-4 and the polymers of Comparative Examples 3-3 and 3-4.

The polymers obtained in the Examples are confirmed to be materials that exhibit rupture strength and/or elongation equivalent to or higher than those of the polymers obtained in the Comparative Examples, and that are also excellent in energy to failure.

Table 1 shows the measurement results of energy to failure ($kJ/m^3$) of the polymers actually obtained in the Examples. Energy to failure of a polymer refers to a value calculated from the area of a tensile-load curve (stress-strain curve).

TABLE 1

| Examples | Energy to Failure ($kJ/m^3$) |
|---|---|
| 2-2-1 | 7.4 |
| 2-5 | 14.2 |
| 2-5-1 | 25.6 |
| 2-5-2 | 30.8 |
| 2-7-1 | 15.3 |
| 2-7-2 | 9.8 |
| 2-7-3 | 9.1 |
| 2-7-4 | 8.1 |

As is clear from Table 1, polymers obtained from a composition containing a solution that contains a first polymerizable compound and a host-group-containing polymerizable compound that is dissolved in the first polymerizable compound exhibit high energy to failure. Although not shown in Table 1, the traditional polymers obtained in the Comparative Examples exhibited an energy to failure of below 5 $kJ/m^3$.

When the compositions for polymerization obtained in the Examples were polymerized even in the absence of a solvent, the resulting polymers were excellent in energy to failure, and their energy to failure exceeded the energy to failure of known chemically crosslinked polymers (e.g., the polymers of Comparative Examples 2-4, 3-2, and 3-3).

The invention claimed is:

1. A composition for polymerization, the composition comprising a solution containing a first polymerizable compound and a host-group-containing polymerizable compound that is dissolved in the first polymerizable compound, wherein the host group present in the host-group-containing polymerizable compound is a group formed by removing one hydrogen atom or hydroxy group from a cyclodextrin, and wherein the cyclodextrin is at least one cyclodextrin selected from the group consisting of α-cyclodextrin, β-cyclodextrin, and γ-cyclodextrin, wherein the host-group-containing polymerizable compound is at least one compound selected from the group consisting of a compound represented by the following formula (h1) and a compound represented by the following formula (h3),

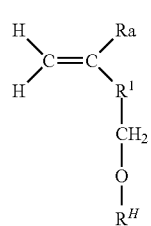

(h1)

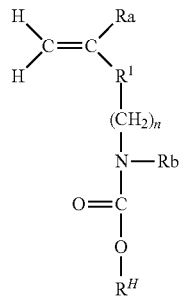

(h3)

and wherein Ra represents a hydrogen atom or a methyl group, $R^H$ represents the host group, $R^1$ represents a divalent group formed by removing one hydrogen atom from a monovalent group selected from the group consisting of a hydroxy group, a thiol group, an alkoxy group optionally having at least one substituent, an thioalkoxy group optionally having at least one substituent, an alkyl group optionally having at least one substituent, an amino group optionally having one substituent, an amide group optionally having one substituent, an aldehyde group, and a carboxy group, n represents an integer of 1 to 20, and Rb represents hydrogen or a linear or branched alkyl group having 1 to 20 carbon atoms.

2. The composition for polymerization according to claim 1, wherein the first polymerizable compound is a polymerizable vinyl compound.

3. The composition for polymerization according to claim 1, wherein the first polymerizable compound contains a (meth)acrylamide derivative.

4. The composition for polymerization according to claim 1, further comprising a guest-group-containing polymerizable compound.

5. The composition for polymerization according to claim 4, wherein the host-group-containing polymerizable compound and the guest-group-containing polymerizable compound are together in the form of a clathrate complex.

6. A polymer obtained from the polymerization of the composition for polymerization of claim 1.

7. A method for producing a polymer, the method comprising polymerizing the composition for polymerization of claim 1 in the absence of a solvent to obtain the polymer.

8. A composition for polymerization, the composition comprising a solution containing a first polymerizable compound and a host-group-containing polymerizable compound that is dissolved in the first polymerizable compound, wherein the host group present in the host-group-containing polymerizable compound is a group formed by removing one hydrogen atom or hydroxy group from a cyclodextrin, wherein the cyclodextrin is at least one cyclodextrin selected from the group consisting of α-cyclodextrin, β-cyclodextrin, and γ-cyclodextrin, and wherein the first polymerizable compound contains a (meth)acrylamide derivative represented by the following formula (1):

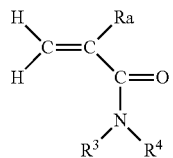

wherein Ra represents a hydrogen atom or a methyl group, $R^3$ represents a hydrogen atom or an optionally substituted hydrocarbon group having 1 to 10 carbon atoms, $R^4$ represents an optionally substituted hydrocarbon group having 1 to 10 carbon atoms, and $R^3$ and $R^4$ may be bound to each other through or not through a heteroatom to form a saturated ring, taken together with a nitrogen atom to which $R^3$ and $R^4$ are bound.

9. The composition for polymerization according to claim 2, wherein the first polymerizable compound contains a (meth)acrylamide derivative.

10. The composition for polymerization according to claim 2, further comprising a guest-group-containing polymerizable compound.

11. The composition for polymerization according to claim 3, further comprising a guest-group-containing polymerizable compound.

12. The composition for polymerization according to claim 10, wherein the host-group-containing polymerizable compound and the guest-group-containing polymerizable compound are together in the form of a clathrate complex.

13. A polymer obtained from the polymerization of the composition for polymerization of claim 2.

14. A polymer obtained from the polymerization of the composition for polymerization of claim 3.

15. A polymer obtained from the polymerization of the composition for polymerization of claim 4.

16. A polymer obtained from the polymerization of the composition for polymerization of claim 5.

17. A method for producing a polymer, the method comprising polymerizing the composition for polymerization of claim 2 in the absence of a solvent to obtain the polymer.

18. A method for producing a polymer, the method comprising polymerizing the composition for polymerization of claim 3 in the absence of a solvent to obtain the polymer.

19. A method for producing a polymer, the method comprising polymerizing the composition for polymerization of claim 4 in the absence of a solvent to obtain the polymer.

20. A method for producing a polymer, the method comprising polymerizing the composition for polymerization of claim 5 in the absence of a solvent to obtain the polymer.

21. A composition for polymerization, the composition comprising a solution containing a first polymerizable compound and a host-group-containing polymerizable compound that is dissolved in the first polymerizable compound,
wherein the host group present in the host-group-containing polymerizable compound is a group formed by removing one hydrogen atom or hydroxy group from a cyclodextrin,
wherein the cyclodextrin is at least one cyclodextrin selected from the group consisting of α-cyclodextrin, β-cyclodextrin, and γ-cyclodextrin,
wherein the host-group-containing polymerizable compound is a compound represented by the following formula (h2),

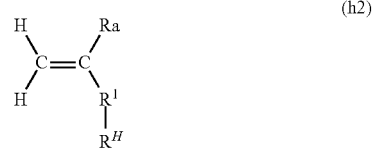

wherein Ra represents a hydrogen atom or a methyl group, $R^H$ represents the host group, and $R^1$ represents a divalent group formed by removing one hydrogen atom from a monovalent group selected from the group consisting of a hydroxy group, a thiol group, an alkoxy group optionally having at least one substituent, an thioalkoxy group optionally having at least one substituent, an alkyl group optionally having at least one substituent, an amino group optionally having one substituent, an amide group optionally having one substituent, an aldehyde group, and a carboxy group, and
wherein the first polymerizable compound contains a (meth)acrylamide derivative.

* * * * *